United States Patent
Higuchi et al.

(10) Patent No.: US 12,013,123 B2
(45) Date of Patent: Jun. 18, 2024

(54) COMBUSTION CYLINDER MOUNTING METHOD AND COMBUSTION CYLINDER MOUNTING JIG

(71) Applicant: MITSUBISHI HEAVY INDUSTRIES, LTD., Tokyo (JP)

(72) Inventors: Satoru Higuchi, Yokohama (JP); Seitaro Muranaka, Takasago (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/790,640

(22) PCT Filed: Feb. 4, 2021

(86) PCT No.: PCT/JP2021/004096
§ 371 (c)(1),
(2) Date: Jul. 1, 2022

(87) PCT Pub. No.: WO2021/181962
PCT Pub. Date: Sep. 16, 2021

(65) Prior Publication Data
US 2023/0043395 A1 Feb. 9, 2023

(30) Foreign Application Priority Data

Mar. 11, 2020 (JP) ................. 2020-041675

(51) Int. Cl.
*F23R 3/60* (2006.01)
*F02C 7/20* (2006.01)

(52) U.S. Cl.
CPC ............. *F23R 3/60* (2013.01); *F02C 7/20* (2013.01); *B23P 2700/13* (2013.01); *F05D 2240/35* (2013.01)

(58) Field of Classification Search
CPC ..... F23R 3/60; F23R 2900/00017; F23R 3/46; F02C 7/20; B23P 2700/13; F05D 2240/35;
(Continued)

(56) References Cited

U.S. PATENT DOCUMENTS

| 4,921,401 A * | 5/1990 | Hall ................. F01D 11/005 |
| | | 415/138 |
| 7,788,932 B2 * | 9/2010 | Kunitake ............. F02C 7/28 |
| | | 60/797 |

(Continued)

FOREIGN PATENT DOCUMENTS

JP 10-231737 9/1998

OTHER PUBLICATIONS

International Search Report dated Apr. 13, 2021 in corresponding International Application No. PCT/JP2021/004096, with English language translation.

(Continued)

*Primary Examiner* — Sarang Afzali
*Assistant Examiner* — Darrell C Ford
(74) *Attorney, Agent, or Firm* — Wenderoth, Lind & Ponack, L.L.P.

(57) ABSTRACT

A combustion cylinder mounting method, wherein a preparation step, a first contact maintenance step, a second contact maintenance step, and a combustion cylinder fixing step are executed. In the preparation step, a combustion cylinder mounting jig equipped with a spacer portion capable of maintaining a predetermined spacing between a first combustion cylinder and a second combustion cylinder adjacent to each other in the circumferential direction is prepared. In the first contact maintenance step, the spacer portion is brought into contact with the first combustion cylinder attached to the stationary portion of a casing. In the second (Continued)

contact maintenance step, the second combustion cylinder is brought into contact with the spacer portion. In the combustion cylinder fixing step, the second combustion cylinder is attached to the stationary portion while the first combustion cylinder and the second combustion cylinder are in contact with the spacer portion.

9 Claims, 11 Drawing Sheets

(58) Field of Classification Search
CPC ........... F05D 2230/644; F05D 2230/72; F05D 2260/02; F01D 9/023; F01D 25/246; Y10T 29/4927
USPC ........................................................ 29/888.06
See application file for complete search history.

(56) References Cited

U.S. PATENT DOCUMENTS

| | | | | |
|---|---|---|---|---|
| 2007/0095071 | A1* | 5/2007 | Kastrup | F23R 3/60 60/748 |
| 2014/0373556 | A1* | 12/2014 | Aronsson | B23K 1/0018 29/888 |
| 2015/0056068 | A1* | 2/2015 | Wiebe | F02C 7/28 415/173.1 |
| 2018/0291758 | A1* | 10/2018 | Seo | F01D 5/066 |

OTHER PUBLICATIONS

English translation of Written Opinion of the International Searching Authority dated Apr. 13, 2021 in corresponding International Application No. PCT/JP2021/004096.

* cited by examiner

COMBUSTION CYLINDER MOUNTING METHOD AND COMBUSTION CYLINDER MOUNTING JIG

TECHNICAL FIELD

The present invention relates to a combustion cylinder mounting method in which a combustion cylinder constituting a portion of a combustor is mounted in a casing of a gas turbine and to a combustion cylinder mounting jig used to perform the method.

Priority is claimed on Japanese Patent Application No. 2020-041675 filed on Mar. 11, 2020, the content of which is incorporated herein by reference.

BACKGROUND ART

A gas turbine includes a compressor that compresses air to generate compressed air, a plurality of combustors that performs combustion of fuel in the compressed air to generate a fuel gas, and a turbine that is driven by a combustion gas. Each of the plurality of the combustors includes a burner that injects the fuel and a combustion cylinder (or transition piece) for sending the combustion gas generated through combustion of the fuel to a turbine. The turbine includes a turbine rotor that rotates around an axis, a turbine casing that covers the rotor, and a plurality of stator vane rows. A plurality of combustion cylinders are mounted in the turbine casing in a state of being arranged in a circumferential direction with respect to the axis.

Disclosed in PTL 1 below is an assembly assist device that assists in mounting a plurality of combustion cylinders in a turbine casing. The assembly assist device includes a gripping device that grips a base end portion (downstream side portion) of a combustion cylinder. The assembly assist device moves the gripping device gripping one combustion cylinder, which is one of the plurality of combustion cylinders, along a rail to move the one of the plurality of combustion cylinders to a target position in the turbine casing. When the one combustion cylinder is moved to the target position, an operator mounts the one combustion cylinder at the target position in the turbine casing.

CITATION LIST

Patent Literature

[PTL 1] Japanese Unexamined Patent Application Publication No. H10-231737

SUMMARY OF INVENTION

Technical Problem

Even in a case where the assembly assist device described in PTL 1 is used, it is difficult to dispose a combustion cylinder adjacent to one combustion cylinder in a circumferential direction at a target relative position with respect to the one combustion cylinder in the circumferential direction with accuracy of 1 mm or less. Therefore, it is considered that a worker needs to finely adjust the position of the combustion cylinder adjacent to the one combustion cylinder even if the assembly assist device described in PTL 1 is used.

Therefore, an object of the present invention is to provide a technique with which it is possible to reduce the amount of work for mounting a plurality of combustion cylinders in a turbine casing.

Solution to Problem

According to an aspect of the invention for achieving the object, there is provided a combustion cylinder mounting method in a gas turbine that includes a turbine including a rotor rotatable around an axis and a casing covering an outer periphery of the rotor and that includes a plurality of combustors sending a combustion gas into the casing and in which the casing includes a stationary portion that is positioned in the casing while being on an axial upstream side out of the axial upstream side and an axial downstream side in an axial direction in which the axis extends, each of the plurality of combustors includes a combustion cylinder in which the combustion gas flows, the respective combustion cylinders of the plurality of combustors are mounted on the stationary portion while being arranged around the axis along a circumferential direction with respect to the axis, and each of a plurality of the combustion cylinders includes a first side surface that faces a first circumferential side out of the first circumferential side and a second circumferential side in the circumferential direction and a second side surface that faces the second circumferential side, the combustion cylinder mounting method including a preparation step of preparing a combustion cylinder mounting jig including a spacer portion that is able to maintain an interval between a first combustion cylinder and a second combustion cylinder that are part of the plurality of the combustion cylinders and are adjacent to each other in the circumferential direction at a predetermined interval by being disposed between the first combustion cylinder and the second combustion cylinder at a predetermined position in the axial direction with respect to each of the first combustion cylinder and the second combustion cylinder, a first contact maintenance step of bringing the spacer portion into contact with the predetermined position of the first combustion cylinder in the axial direction at the second side surface of the first combustion cylinder mounted on the stationary portion, a second contact maintenance step of bringing the predetermined position of the second combustion cylinder in the axial direction into contact with the spacer portion during the first contact maintenance step at the first side surface of the second combustion cylinder, and a combustion cylinder fixing step of mounting the second combustion cylinder on the stationary portion in a state where the first combustion cylinder and the second combustion cylinder are in contact with the spacer portion.

According to the aspect, the spacer portion of the combustion cylinder mounting jig is interposed between the first combustion cylinder and the second combustion cylinder in the circumferential direction. Therefore, it is possible to dispose with high accuracy the second combustion cylinder at a target relative position with respect to the first combustion cylinder in the circumferential direction. Therefore, it is possible to omit fine adjustment for disposing the second combustion cylinder with high accuracy at the target relative position with respect to the first combustion cylinder in the circumferential direction or to reduce the amount of fine adjustment. Therefore, according to the aspect, it is possible to reduce the amount of work for mounting the plurality of combustion cylinders in the turbine casing.

According to an aspect of the present invention for achieving the object, there is provided a combustion cylinder mounting jig used when mounting a combustion cylinder in a gas turbine that includes a turbine including a rotor rotatable around an axis and a casing covering an outer periphery of the rotor and that includes a plurality of combustors sending a combustion gas into the casing and in which the casing includes a stationary portion that is positioned in the casing while being on an axial upstream side out of the axial upstream side and an axial downstream side in an axial direction in which the axis extends, each of the plurality of combustors includes a combustion cylinder in which the combustion gas flows, and the respective combustion cylinders of the plurality of combustors are mounted on the stationary portion while being arranged around the axis along a circumferential direction with respect to the axis, the combustion cylinder mounting jig including a spacer portion that is able to maintain an interval between two combustion cylinders that are part of the plurality of the combustion cylinders and are adjacent to each other in the circumferential direction at a predetermined interval by being disposed between the two combustion cylinders at a predetermined position in the axial direction with respect to each of the two combustion cylinders, and a spacer mounting portion that is fixed to the spacer portion and that is mountable on the stationary portion so as to maintain the spacer portion to be immovable relative to the stationary portion. The spacer portion extends in a first direction, the spacer portion includes an interval maintenance portion of which a thickness in a second direction perpendicular to the first direction in the spacer portion corresponds to the predetermined interval, a length of the spacer portion in the first direction is larger than a length of the combustion cylinder in a radial direction with respect to the axis at the predetermined position in the axial direction of the combustion cylinder, and the spacer mounting portion is fixed to an end of the spacer portion in the first direction.

Since the spacer portion of the combustion cylinder mounting jig of the aspect is interposed between the first combustion cylinder and the second combustion cylinder in the circumferential direction, it is possible to dispose with high accuracy the second combustion cylinder at a target relative position with respect to the first combustion cylinder in the circumferential direction. Therefore, it is possible to omit fine adjustment for disposing the second combustion cylinder with high accuracy at the target relative position with respect to the first combustion cylinder in the circumferential direction or to reduce the amount of fine adjustment. Therefore, by using the combustion cylinder mounting jig of the aspect, it is possible to reduce the amount of work for mounting the plurality of combustion cylinders in the turbine casing.

According to the aspect, the predetermined interval can be set as an interval that is between the first combustion cylinder and the second combustion cylinder and is on a radial outer side and the predetermined interval can be set as an interval that is between the first combustion cylinder and the second combustion cylinder and is on a radial inner side. In addition, according to the aspect, it is possible to fix a spacer mounting portion to an end of a spacer portion.

Advantageous Effects of Invention

According to an aspect of the present invention, it is possible to dispose a combustion cylinder that is adjacent to another combustion cylinder in a circumferential direction at a target relative position with respect to the other combustion cylinder in the circumferential direction. Therefore, according to the aspect of the present invention, it is possible to reduce the amount of work for mounting a plurality of combustion cylinders in a turbine casing.

DESCRIPTION OF EMBODIMENTS

Hereinafter, an embodiment according to the present invention and a modification example thereof will be described in detail with reference to the drawings.

[Embodiment of Gas Turbine]

An embodiment of a gas turbine will be described with reference to FIGS. 1 to 6.

Figure 1:
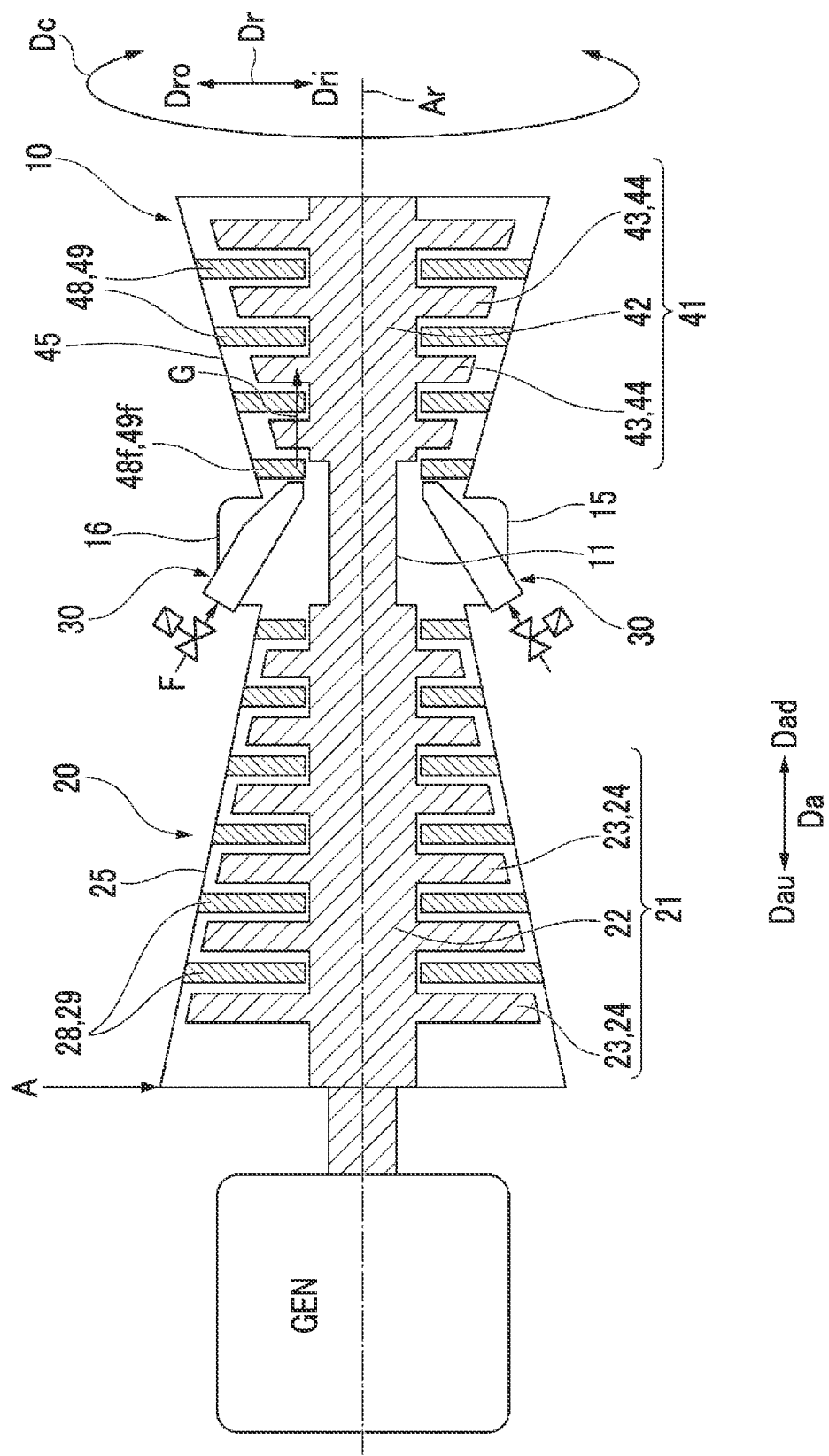
FIG. 1 is a schematic cross-sectional view of a gas turbine according to an embodiment of the present invention.

As shown in FIG. 1, a gas turbine of the present embodiment includes a compressor 20 that compresses air A, a plurality of combustors 30 that performs combustion of fuel F in the air A compressed by the compressor 20 to generate a combustion gas G, and a turbine 40 that is driven by the combustion gas G.

The compressor 20 includes a compressor rotor 21 that rotates around an axis Ar, a compressor casing 25 that covers the compressor rotor 21, and a plurality of stator vane rows 28. The turbine 40 includes a turbine rotor 41 that rotates around the axis Ar, a turbine casing 45 that covers the turbine rotor 41, and a plurality of stator vane rows 48. Note that, hereinafter, a direction in which the axis Ar extends will be referred to as an axial direction Da, a circumferential direction around the axis Ar will be referred to as a circumferential direction Dc, and a direction perpendicular to the axis Ar will be referred to as a radial direction Dr. In addition, one side in the axial direction Da will be referred to as an axial upstream side Dau and the opposite side will be referred to as an axial downstream side Dad. In addition, a side close to the axis Ar in the radial direction Dr will be referred to as a radial inner side Dri and the opposite side will be referred to as a radial outer side Dro.

The compressor 20 is disposed closer to the axial upstream side Dau than the turbine 40.

The compressor rotor 21 and the turbine rotor 41 are positioned on the same axis Ar and are connected to each other to form a gas turbine rotor 11. For example, a rotor of a generator GEN is connected to the gas turbine rotor 11. The gas turbine further includes an intermediate casing 16. The intermediate casing 16 is disposed between the compressor casing 25 and the turbine casing 45 in the axial direction Da. The compressor casing 25, the intermediate casing 16, and the turbine casing 45 are connected to each other to form a gas turbine casing 15.

The compressor rotor 21 includes a rotor shaft 22 that is centered on the axis Ar and that extends in the axial direction Da and a plurality of rotor vane rows 23 mounted on the rotor shaft 22. The plurality of rotor vane rows 23 are arranged in the axial direction Da. Each of the rotor vane rows 23 is composed of a plurality of rotor vanes 24 arranged in the circumferential direction Dc. For each of the plurality of rotor vane rows 23, one of the plurality of stator vane rows 28 is disposed on the axial downstream side Dad. Each of the stator vane rows 28 is provided inside the compressor casing 25. Each of the stator vane rows 28 is composed of a plurality of stator vanes 29 arranged in the circumferential direction Dc.

Figure 2:
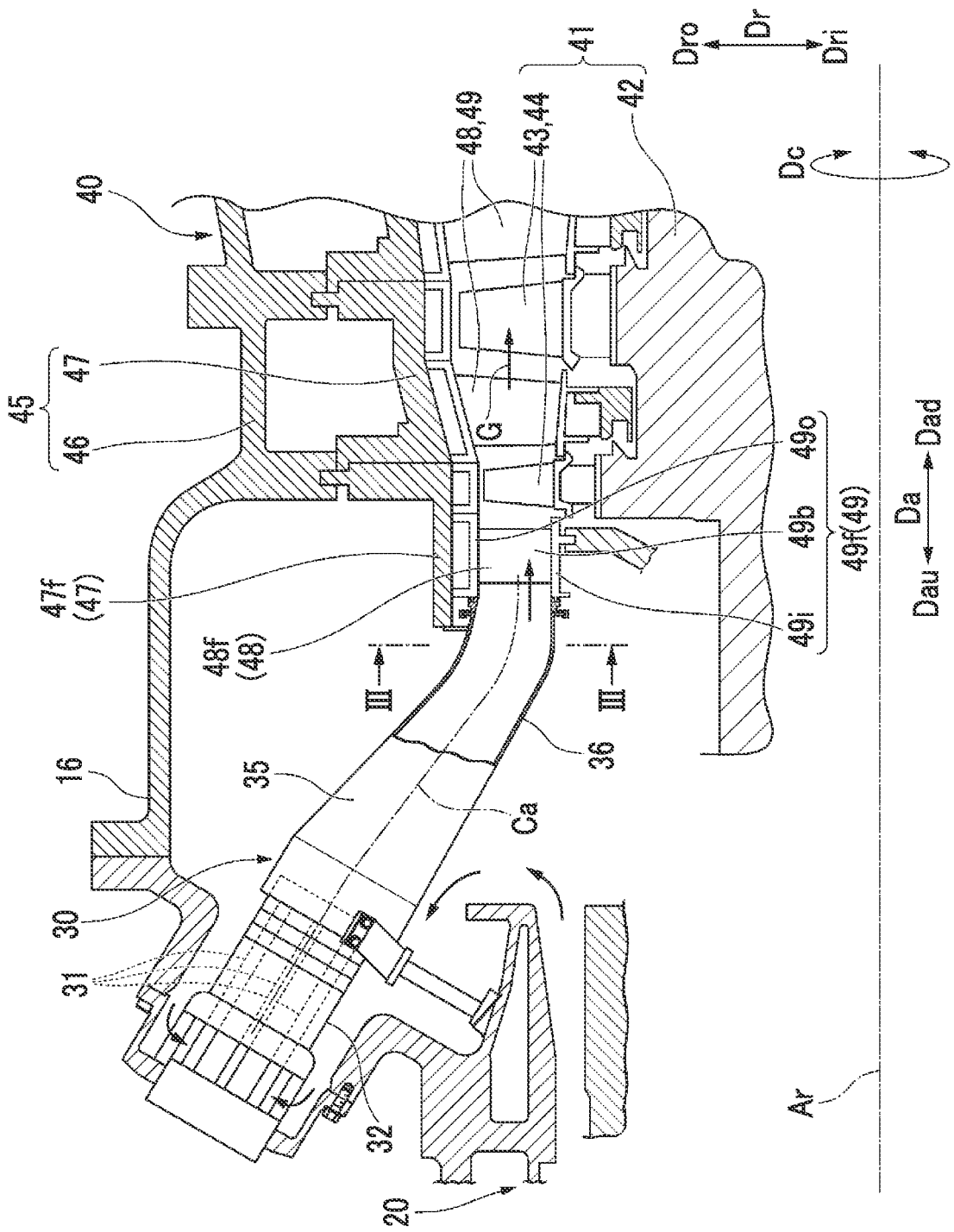
FIG. 2 is a cross-sectional view of a main part of the gas turbine according to the embodiment of the present invention.

As shown in FIGS. 1 and 2, the turbine rotor 41 includes a rotor shaft 42 that is centered on the axis Ar and that extends in the axial direction Da and a plurality of rotor vane rows 43 mounted on the rotor shaft 42. The plurality of rotor vane rows 43 are arranged in the axial direction Da. Each of the rotor vane rows 43 is composed of a plurality of rotor vanes 44 arranged in the circumferential direction Dc. For each of the plurality of rotor vane rows 43, one of the plurality of stator vane rows 48 is disposed on the axial upstream side Dau. Each of the stator vane rows 48 is provided inside the turbine casing 45. Each of the stator vane rows 48 is composed of a plurality of stator vanes 49 arranged in the circumferential direction Dc. Each of the plurality of stator vanes 49 includes a vane body 49b that extends in the radial direction, an outer shroud 49o that is connected to the radial outer side Dro of the vane body 49b, and an inner shroud 49i that is connected to the radial inner side Dri of the vane body 49b. Note that, hereinafter, one of the plurality of stator vane rows 48 that is closest to the axial upstream side Dau will be referred to as a first-stage stator vane row 48f. In addition, each of a plurality of stator vanes 49 constituting the first-stage stator vane row 48f will be referred to as a first-stage stator vane 49f.

The turbine casing 45 includes a plurality of vane rings 47 and a casing main body 46. Each of the plurality of vane rings 47 has an annular shape around the axis Ar. Each of the plurality of vane rings 47 supports one of the plurality of the stator vane rows 48 from the radial outer side Dro. The casing main body 46 is positioned closer to the radial outer side Dro than the plurality of vane rings 47 and supports the plurality of vane rings 47 from the radial outer side Dro. Note that, hereinafter, one of the plurality of vane rings 47 that supports the first-stage stator vane row 48f will be referred to as a first-stage vane ring 47f.

An annular space that is formed between an outer peripheral side of the rotor shaft 42 and an inner peripheral side of the turbine casing 45 and in which the stator vanes 49 and the rotor vanes 44 are disposed in the axial direction Da constitutes a combustion gas flow channel through which the combustion gas G from the combustors 30 flows. The combustion gas flow channel is annular around the axis Ar and is long in the axial direction Da.

The plurality of combustors 30 are mounted in the intermediate casing 16 while being arranged along the circumferential direction Dc around the axis Ar. Each of the combustors 30 includes a combustion cylinder (or transition piece) 35, a plurality of burners 31 that inject fuel into the combustion cylinder 35, and a burner frame 32 that supports the plurality of burners 31. In the combustion cylinder 35, the fuel F is subjected to combustion and the combustion gas G generated through the combustion flows.

Figure 3:
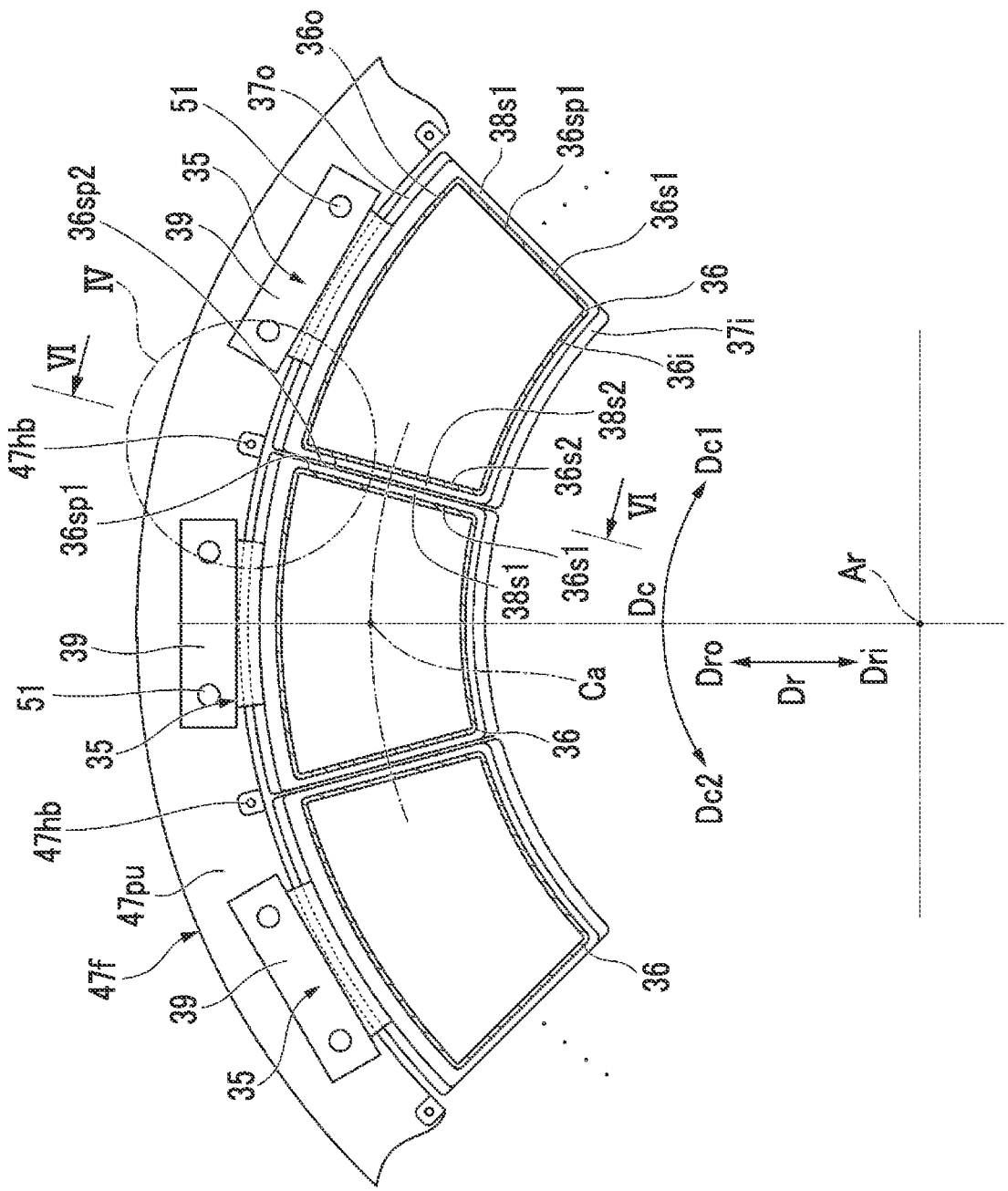
FIG. 3 is a cross-sectional view taken along line III-III in FIG. 2.

As shown in FIG. 3, the combustion cylinder 35 includes a tube 36 that has a tubular shape centered on a combustor axis Ca, an outer outlet flange 37o, an inner outlet flange 37i, a first side flange 38s1, a second side flange 38s2, and a casing mounting plate 39. The combustor axis Ca extends in a direction including a directional component of the axial direction Da. Therefore, the tube 36 also extends in a direction including a directional component of the axial direction Da. On the axial upstream side Dau, the shape of the tube 36 is substantially circular as seen in the axial direction Da. However, on the axial downstream side Dad, the shape of the tube 36 has a shape like an isosceles trapezoid as seen in the axial direction Da. Therefore, a portion of the tube 36 that is on the axial downstream side Dad is configured to include an outer plate 36o that corresponds to the longer base of two bases of an isosceles trapezoid, an inner plate 36i that corresponds to the shorter base of the two bases, a first side plate 36s1 that corresponds to one of two legs of the isosceles trapezoid, and a second side plate 36s2 that corresponds to the other one of the two legs of the isosceles trapezoid. Note that both of the outer plate 36o that corresponds to the longer base of the two bases of the isosceles trapezoid and the inner plate 36i that corresponds to the shorter base of the two bases are arc plates that are arc-shaped around the axis Ar instead of being flat plates. In addition, of a first circumferential side Dc1 and a second circumferential side Dc2 in the circumferential direction Dc, the second side plate 36s2 is positioned closer to the second circumferential side Dc2 than the first side plate 36s1. Of outer surfaces of the first side plate 36s1, an outer surface on a side opposite to an inner surface that comes into contact with the combustion gas G forms a first side surface 36sp1 of the tube 36. In addition, of outer surfaces of the second side plate 36s2, an outer surface on a side opposite to an inner surface that comes into contact with the combustion gas G forms a second side surface 36sp2 of the tube 36.

The outer outlet flange 37o protrudes toward the radial outer side Dro from the outer plate 36o of the tube 36. In addition, the inner outlet flange 37i protrudes toward the radial inner side Dri from the inner plate 36i of the tube 36. The first side flange 38s1 protrudes toward the first circumferential side Dc1 from the first side plate 36s1 of the tube 36. The second side flange 38s2 protrudes toward the second circumferential side Dc2 from the second side plate 36s2 of the tube 36. The casing mounting plate 39 protrudes toward the radial outer side Dro from the outer plate 36o of the tube 36 at a position closer to the axial upstream side Dau than the outer outlet flange 37o.

Figure 6:
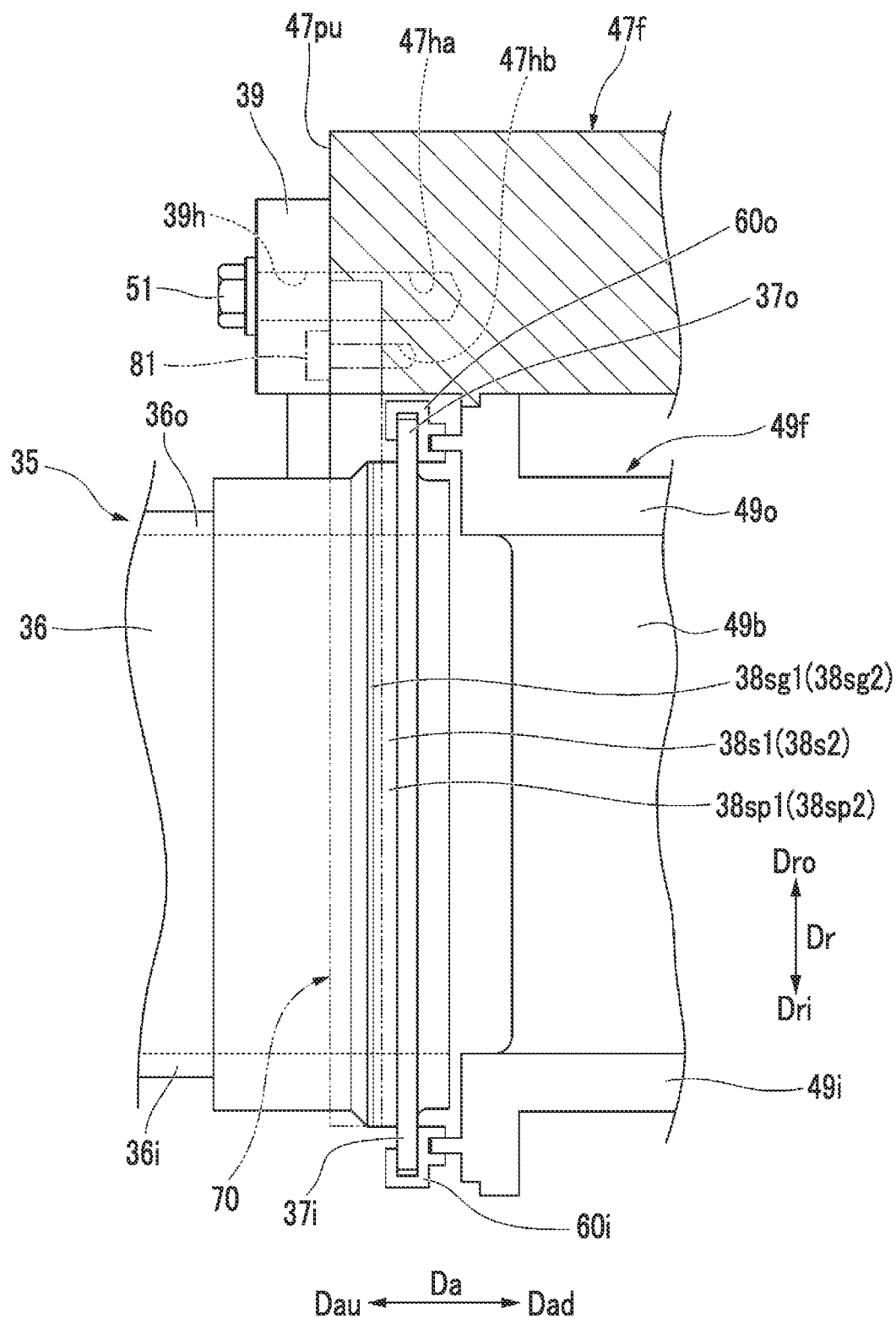
FIG. 6 is a view as seen along arrow VI in FIG. 3.

As shown in FIG. 6, the outer shroud 49o of the first-stage stator vane 49f and the outer outlet flange 37o of the combustion cylinder 35 are connected to each other via an outer outlet seal 60o. In addition, the inner shroud 49i of the first-stage stator vane 49f and the inner outlet flange 37i of the combustion cylinder 35 are connected to each other via an inner outlet seal 60i.

Figure 4:
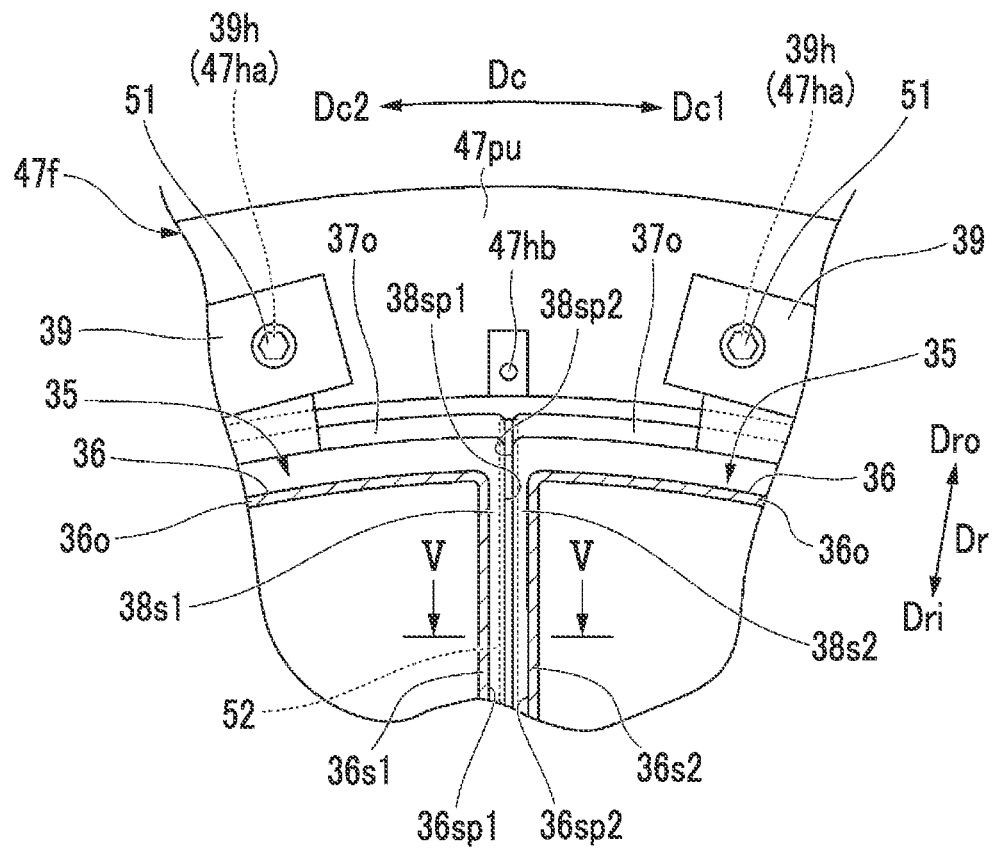
FIG. 4 is an enlarged view of part IV of FIG. 3.
Figure 5:
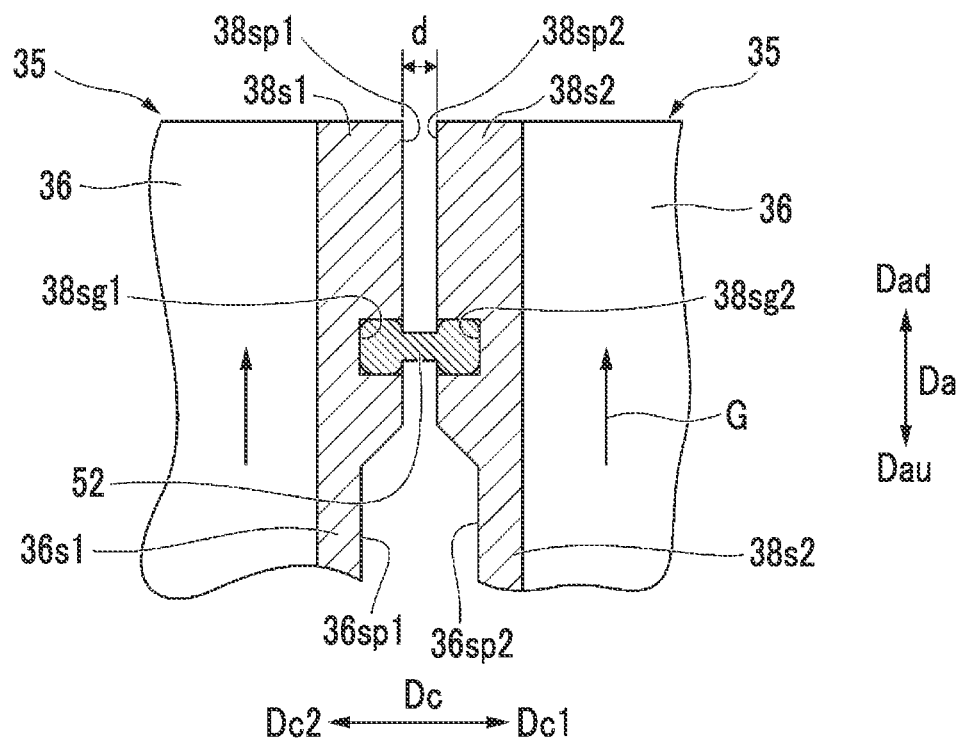
FIG. 5 is a cross-sectional view taken along line V-V in FIG. 4.

As shown in FIGS. 4 to 6, the first side flange 38s1 includes a first flange side surface 38sp1 that faces the first circumferential side Dc1 and a first seal groove 38sg1 that is recessed toward the second circumferential side Dc2 from the first flange side surface 38sp1 and that extends in the radial direction Dr. The first flange side surface 38sp1 forms a portion of the first side surface 36sp1 that is on the axial downstream side Dad. The second side flange 38s2 includes a second flange side surface 38sp2 that faces the second circumferential side Dc2 and a second seal groove 38sg2 that is recessed toward the first circumferential side Dc1 from the second flange side surface 38sp2 and that extends in the radial direction Dr. The second flange side surface 38sp2 forms a portion of the second side surface 36sp2 that is on the axial downstream side Dad. Both of the first flange side surface 38sp1 and the second flange side surface 38sp2 are flat surfaces. In addition, a length L1 of the first flange side surface 38sp1 in the radial direction Dr and the length L1 of the second flange side surface 38sp2 in the radial direction Dr are substantially the same. The second flange side surface 38sp2 of one combustion cylinder 35 that is positioned on the first circumferential side Dc1 and the first flange side surface 38sp1 of the other combustion cylinder 35 that is positioned closer to the second circumferential side Dc2 than the one combustion cylinder 35 are substantially parallel to each other with an interval provided therebetween in the circumferential direction Dc, the one combustion cylinder 35 and the other combustion cylinder 35 being two combustion cylinders 35 that are adjacent to each other in the circumferential direction Dc. As the interval in the circumferential direction Dc between the second flange side surface 38sp2 of the one combustion cylinder 35 in the circumferential direction Dc and the first flange side surface 38sp1 of the other combustion cylinder 35, a predetermined interval d (refer to FIG. 5) is set. The predetermined interval d is, for example, an interval of 1 mm to 8 mm. A side seal (seal member) 52 is mounted in the second seal groove 38sg2 of the one combustion cylinder 35 and the first seal groove 38sg1 of the other combustion cylinder 35. The side seal 52 seals a gap between the second flange side surface 38sp2 of the one combustion cylinder 35 and the first flange side surface 38sp1 of the other combustion cylinder 35.

As shown in FIGS. 4 and 6, bolt holes 39h that penetrate the casing mounting plate 39 in the axial direction Da are formed in the casing mounting plate 39. Shaft portions of tube mounting bolts 51 are inserted into the bolt holes 39h. A plurality of tube mounting screw holes 47ha that are recessed toward the axial downstream side Dad from an upstream side end surface 47pu are formed in the first-stage vane ring 47f, the upstream side end surface 47pu facing the axial upstream side Dau at the first-stage vane ring 47f. The plurality of tube mounting screw holes 47ha are arranged in the circumferential direction Dc. The combustion cylinder 35 is mounted on the first-stage vane ring (stationary portion) 47f via the tube mounting bolts 51 that are inserted into the bolt holes 39h of the casing mounting plate 39 and screwed into the tube mounting screw holes 47ha of the first-stage vane ring 47f.

[Embodiment of Combustion Cylinder Mounting Method and Combustion Cylinder Mounting Jig]

An embodiment of a combustion cylinder mounting method and a combustion cylinder mounting jig will be described with reference to FIGS. 7 to 11.

First, the combustion cylinder mounting jig will be described with reference to FIG. 7.

A combustion cylinder mounting jig 70 includes a spacer portion 71, a spacer mounting portion 75, a jig mounting bolt 81, and an extraction metal fitting 82.

The spacer portion 71 is a rectangular plate. Here, a direction in which the long side of the rectangular plate extends will be referred to as a first direction D1, the thickness direction of the rectangular plate will be referred to as a second direction D2, and a direction in which the short side of the rectangular plate extends will be referred to as a third direction D3. The first direction D1, the second direction D2, and the third direction D3 are directions perpendicular to each other. One of two surfaces of the spacer portion 71 that face opposite sides in the second direction D2 is a first contact surface 73a and the other of the two surfaces is a second contact surface 73b, the spacer portion 71 being a rectangular plate.

The spacer portion 71 includes an interval maintenance portion 72 for maintaining an interval in the circumferential direction Dc between the second side surface 36sp2 of one of two combustion cylinders 35 adjacent to each other in the circumferential direction Dc and the first side surface 36sp1 of the other of the two combustion cylinders 35 at the predetermined interval d. A thickness t1 of the spacer portion 71 which is the dimension of the spacer portion 71 in the second direction D2 (in other words, interval between first contact surface 73a and second contact surface 73b) is a dimension corresponding to the predetermined interval d. Note that "the dimension corresponding to the predetermined interval d" means a dimension that is substantially the same as the predetermined interval d. Therefore, in the present embodiment, the entire spacer portion 71 becomes the interval maintenance portion 72.

A length L2 of the spacer portion 71 in the first direction D1 is larger than the length L1 in the radial direction Dr of the first flange side surface 38sp1 and the second flange side surface 38sp2 of each combustion cylinder 35.

The spacer mounting portion 75 includes a slit 76, a bolt insertion hole 78, and a screw hole 79. The slit 76 is a notch recessed in the first direction D1. An end of the spacer portion 71 in the first direction D1 is inserted into the slit 76 of the spacer mounting portion 75. An end portion of the spacer portion 71 in the first direction D1 is fixed to the spacer mounting portion 75 via a welded portion 77 in a state of being inserted into the slit 76.

The spacer portion 71 is likely to be worn because of contact between the spacer portion 71 and the combustion cylinders 35. Therefore, in a case where the combustion cylinder mounting jig 70 is used repeatedly, the spacer portion 71 is thinned and a function of maintaining an interval between two combustion cylinders 35 is deteriorated. Therefore, it is preferable that the spacer portion 71 is replaceable. In the present embodiment, as described above, the spacer portion 71 and the spacer mounting portion 75 are manufactured as separate components and then both of the components are bonded to each other via welding. Therefore, the spacer portion 71 can be removed from the spacer mounting portion 75 relatively easily, and thus the spacer portion 71 can be easily replaced. Furthermore, in the present embodiment, the spacer portion 71 and the spacer mounting portion 75 are welded after the end of the spacer portion 71 is inserted into the slit 76 of the spacer mounting portion 75. Therefore, it is possible to firmly fix the spacer portion 71 to the spacer mounting portion 75 while securing easiness of replacement of the spacer portion 71.

The screw hole 79 of the spacer mounting portion 75 is a screw hole recessed in the third direction D3. The extraction metal fitting 82 is screwed into the screw hole 79. The bolt insertion hole 78 is a hole that penetrates the spacer mounting portion 75 in the third direction D3 and through which a shaft portion of the jig mounting bolt 81 can be inserted.

As shown in FIG. 6, a plurality of jig mounting screw holes 47hb that are recessed toward the axial downstream side Dad from the upstream side end surface 47pu of the first-stage vane ring 47f are formed in the first-stage vane ring 47f. The plurality of jig mounting screw holes 47hb are arranged in the circumferential direction Dc. The combustion cylinder mounting jig 70 is mounted on the first-stage vane ring (stationary portion) 47f via the jig mounting bolt 81 that is inserted into the bolt insertion hole 78 of the spacer mounting portion 75 and screwed into the jig mounting screw hole 47hb of the first-stage vane ring 47f. Note that a typical example of the extraction metal fitting 82 is an eyebolt. That is, the extraction metal fitting 82 only has to have a shape that can be mounted on the spacer mounting portion 75 and with which it is possible to easily pull out the spacer mounting portion 75.

Figure 8:
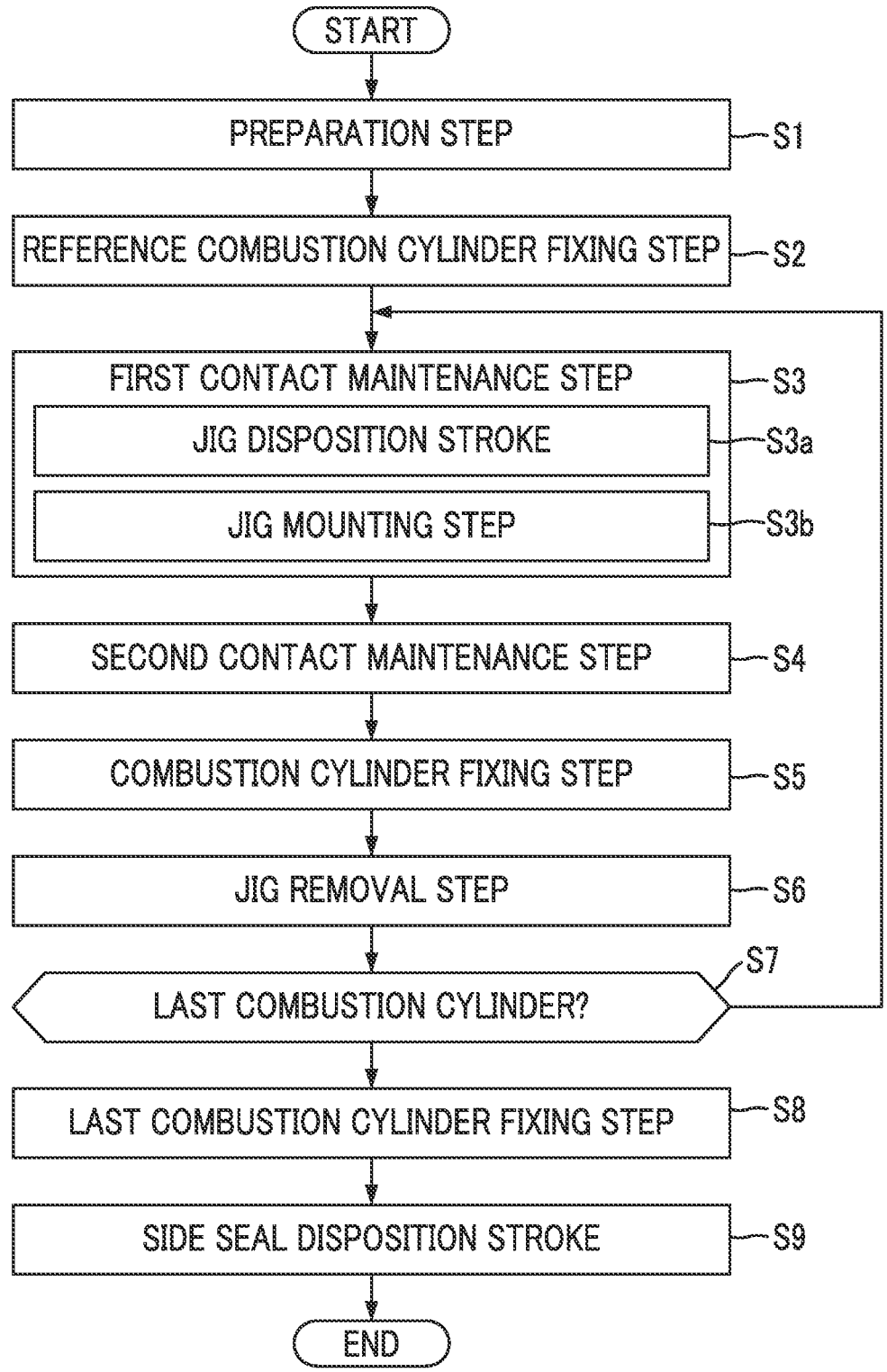
FIG. 8 is a flowchart showing a combustion cylinder mounting method according to an embodiment of the present invention.

Next, a method of mounting the combustion cylinder 35 in the present embodiment will be described with reference to a flowchart shown in FIG. 8.

Figure 7:
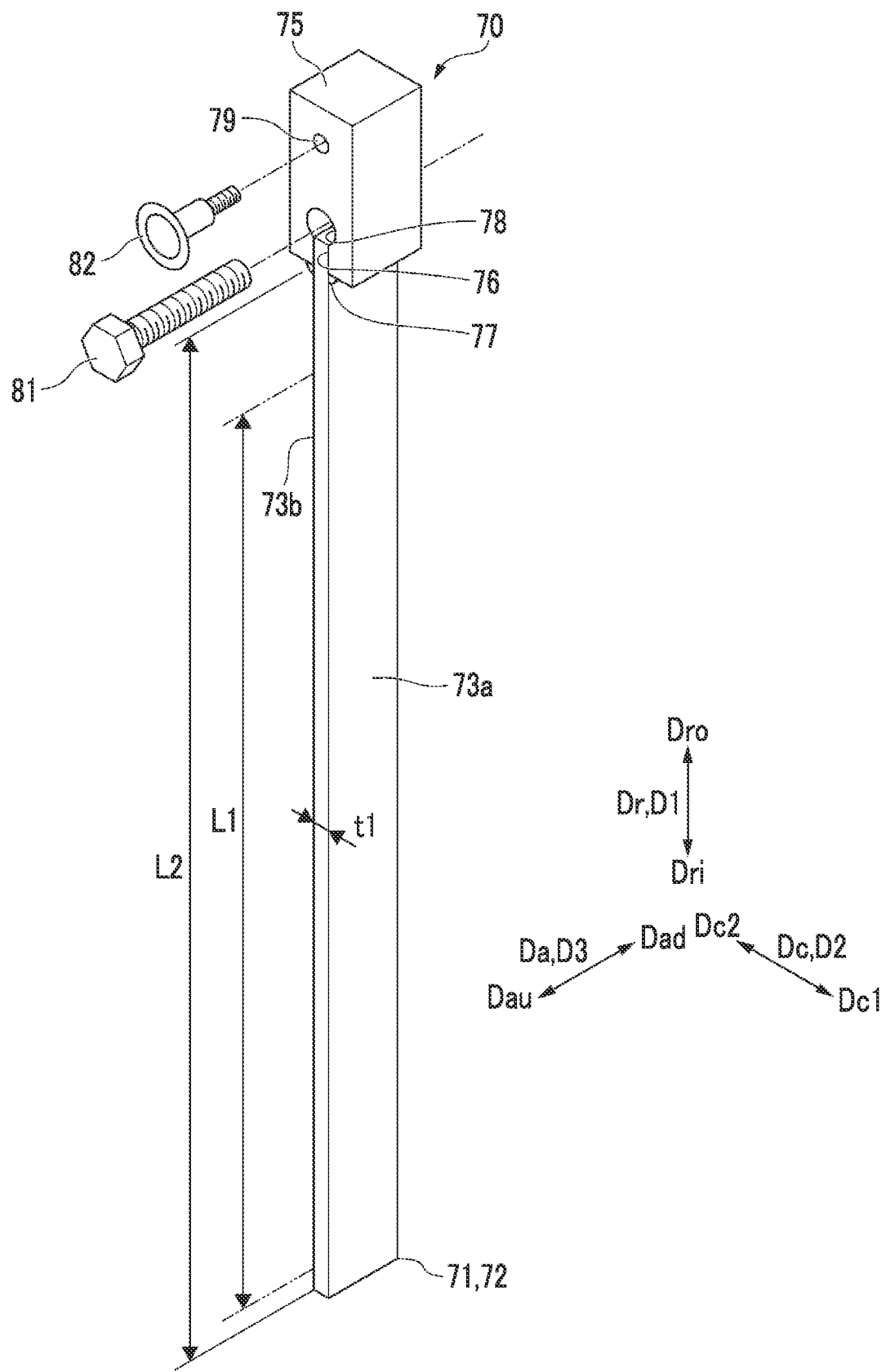
FIG. 7 is a perspective view of a combustion cylinder mounting jig according to an embodiment of the present invention.

First, the combustion cylinder mounting jig 70 shown in FIG. 7 is prepared (S1: preparation step).

Next, one of the plurality of combustion cylinders 35 is set as a reference combustion cylinder 35 and the reference combustion cylinder 35 is mounted on the first-stage vane ring (stationary portion) 47f (S2: reference combustion cylinder fixing step). At this time, the tube mounting bolts 51 are inserted into the bolt holes 39h of the casing mounting plate 39 of the reference combustion cylinder 35. Then, the tube mounting bolts 51 are screwed into a portion of the plurality of tube mounting screw holes 47ha formed in the first-stage vane ring 47f, the portion of the plurality of tube mounting screw holes 47ha being present in a mounting region of the first-stage vane ring 47f where the reference combustion cylinder 35 is mounted.

Figure 9:
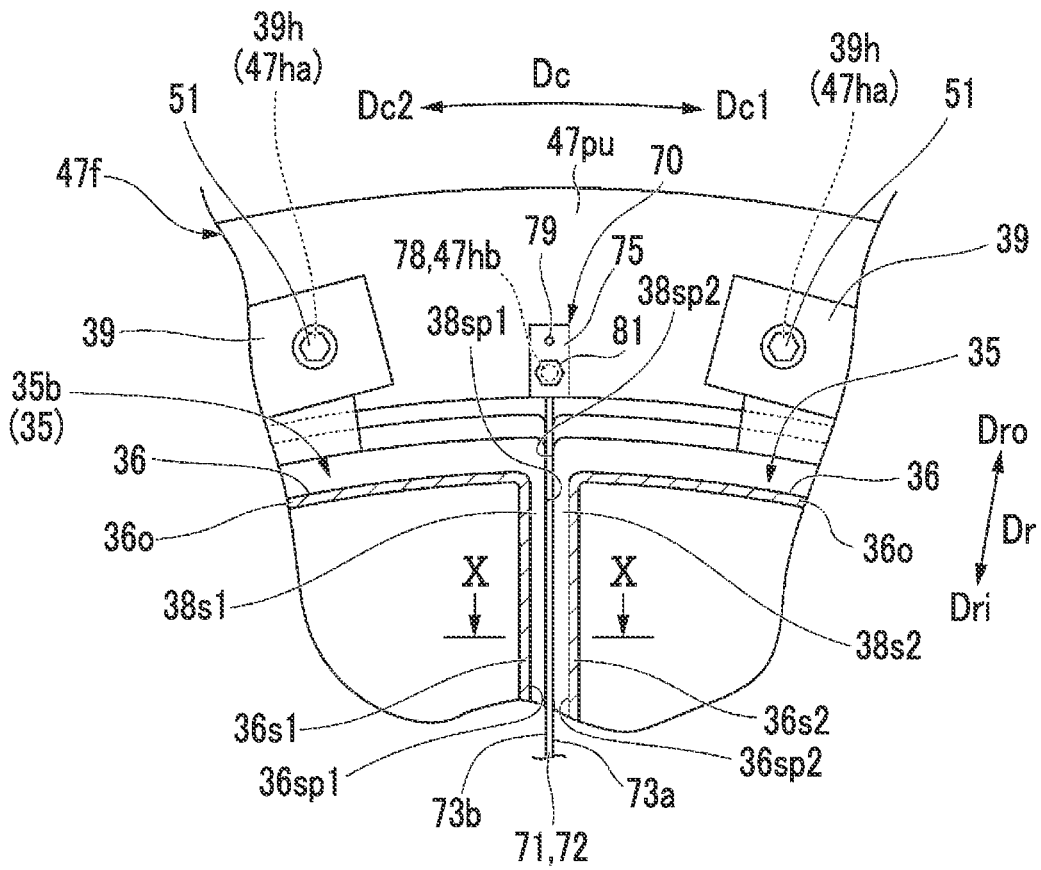
FIG. 9 is a view obtained by adding the combustion cylinder mounting jig to FIG. 4.
Figure 10:
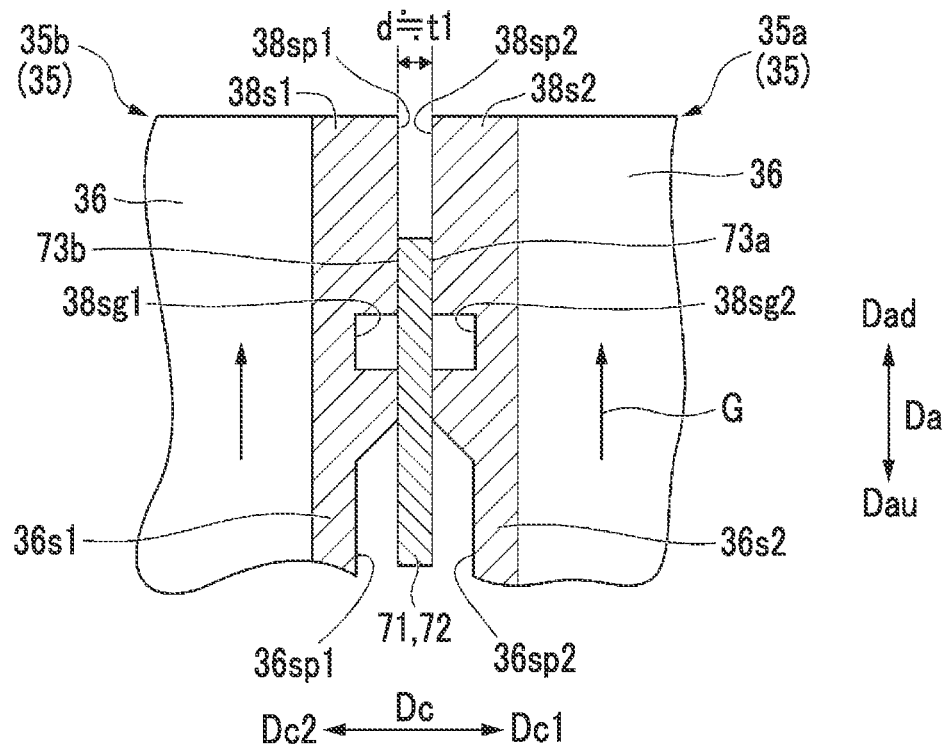
FIG. 10 is a cross-sectional view taken along line X-X in FIG. 9.
Figure 11:
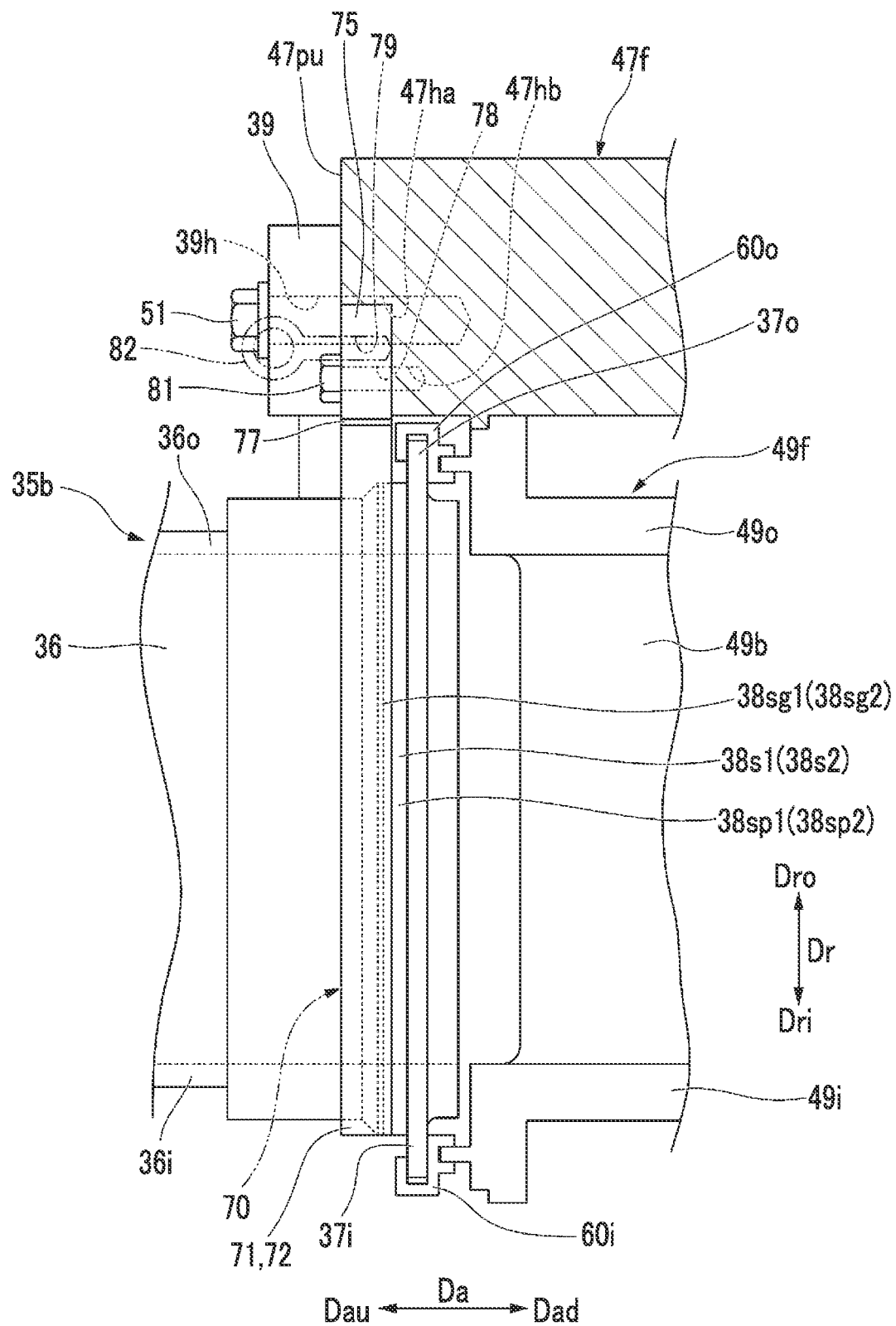
FIG. 11 is a view obtained by adding the combustion cylinder mounting jig to FIG. 6.

Next, as shown in FIGS. 9 to 11, the reference combustion cylinder 35 mounted on the first-stage vane ring 47f is set as a first combustion cylinder 35a and the spacer portion 71 of the combustion cylinder mounting jig 70 is brought into contact with the second flange side surface 38sp2 of the first combustion cylinder 35a (S3: first contact maintenance step). The first contact maintenance step (S3) includes a jig disposition step (S3a) and a jig mounting step (S3b).

In the jig disposition step (S3a), the combustion cylinder mounting jig 70 is disposed such that the first contact surface 73a of the combustion cylinder mounting jig 70 comes into contact with the second flange side surface 38sp2 of the first combustion cylinder 35a. Note that the second flange side surface 38sp2 is a surface of the first combustion cylinder 35a that is formed at a predetermined position on the second side surface 36sp2 of the first combustion cylinder 35a in the axial direction Da of the first combustion cylinder 35a. In the jig mounting step (S3b), the combustion cylinder mounting jig 70 is mounted on the first-stage vane ring (stationary portion) 47f in a state where the first contact surface 73a of the combustion cylinder mounting jig 70 is in contact with the second flange side surface 38sp2 of the first combustion cylinder 35a. At this time, the shaft portion of the jig mounting bolt 81 is inserted into the bolt insertion hole 78 of the combustion cylinder mounting jig 70. Then, the jig mounting bolt 81 is screwed into one of the plurality of jig mounting screw holes 47hb formed in the first-stage vane ring 47f, the one of the plurality of jig mounting screw holes 47hb being present in a mounting region of a first-stage vane ring 47f where the combustion cylinder mounting jig 70 brought into contact with the second flange side surface 38sp2 of the first combustion cylinder 35a is mounted. In this manner, processing in the first contact maintenance step (S3) ends.

Next, a second combustion cylinder 35b that is adjacent to the first combustion cylinder 35a in the circumferential direction Dc is brought into contact with the combustion cylinder mounting jig 70 during the first contact maintenance step (S3) (that is, combustion cylinder mounting jig 70 being in contact with first combustion cylinder 35a) (S4: second contact maintenance step). As described above, in the present embodiment, the spacer portion 71 of the combustion cylinder mounting jig 70 is interposed between the first combustion cylinder 35a and the second combustion cylinder 35b in the circumferential direction Dc. Therefore, it is possible to dispose with high accuracy the second combustion cylinder 35b at a target relative position with respect to the first combustion cylinder 35a in the circumferential direction Dc.

Next, the second combustion cylinder 35b is mounted on the first-stage vane ring (stationary portion) 47f in a state where the first combustion cylinder 35a and the second combustion cylinder 35b are in contact with the spacer portion 71 of the combustion cylinder mounting jig 70 (S5: combustion cylinder fixing step). At this time, as with the fixing step (S2) of the reference combustion cylinder 35, the tube mounting bolts 51 are inserted into the bolt holes 39h of the casing mounting plate 39 of the second combustion cylinder 35b. Then, the tube mounting bolts 51 are screwed into a portion of the plurality of tube mounting screw holes 47ha formed in the first-stage vane ring 47f, the portion of the plurality of tube mounting screw holes 47ha being present in a mounting region of the upstream side end surface 47pu of the first-stage vane ring 47f where the second combustion cylinder 35b is mounted.

Next, the combustion cylinder mounting jig 70 is moved such that the spacer portion 71 of the combustion cylinder mounting jig 70 that is in contact with the first combustion cylinder 35a and the second combustion cylinder 35b mounted on the first-stage vane ring 47f is removed from a space between the first combustion cylinder 35a and the second combustion cylinder 35b (S6: jig removal step). At this time, the jig mounting bolt 81 via which the combustion cylinder mounting jig 70 is mounted on the first-stage vane ring 47f is removed from the first-stage vane ring 47f and the combustion cylinder mounting jig 70. The first-stage vane ring 47f and the like are present on the axial downstream side Dad with respect to the combustion cylinder mounting jig 70. Therefore, the combustion cylinder mounting jig 70 is moved toward the axial upstream side Dau.

In a case of moving the combustion cylinder mounting jig 70 interposed between the first combustion cylinder 35a and the second combustion cylinder 35b, it may be difficult to move the combustion cylinder mounting jig 70 since a frictional force acting between the combustion cylinder mounting jig 70 and the first combustion cylinder 35a and a frictional force acting between the combustion cylinder mounting jig 70 and the second combustion cylinder 35b are large. In this case, the extraction metal fitting 82 is mounted into the spacer mounting portion 75 of the combustion cylinder mounting jig 70. Then, a wire or the like may be hooked onto the extraction metal fitting 82 and the wire or the like may be pulled toward the axial upstream side Dau so that the combustion cylinder mounting jig 70 is moved toward the axial upstream side Dau.

Next, an operator determines whether or not the combustion cylinder to be mounted on the first-stage vane ring 47f next is the last combustion cylinder 35 to be mounted (S7).

In a case where the operator determines in S7 that the combustion cylinder to be mounted on the first-stage vane ring 47*f* next is not the last combustion cylinder 35 to be mounted, the process returns to S3 and the steps of S3 to S6 are performed. If the process returns to S3, the operator sets the second combustion cylinder 35*b* mounted on the first-stage vane ring 47*f* in the combustion cylinder fixing step (S5) as the first combustion cylinder 35*a* and performs the first contact maintenance step (S3).

In a case where the operator determines in S7 that the combustion cylinder to be mounted on the first-stage vane ring 47*f* next is the last combustion cylinder 35 to be mounted, the last combustion cylinder 35 is mounted on the first-stage vane ring (stationary portion) 47*f* (S8: last combustion cylinder fixing step). Immediately before the last combustion cylinder 35 is mounted on the first-stage vane ring 47*f*, the combustion cylinder 35 (hereinafter, will be referred to as first side combustion cylinder 35) mounted on the first-stage vane ring 47*f* is present on the first circumferential side Dc1 with respect to a region where the last combustion cylinder 35 is mounted and the combustion cylinder 35 (hereinafter, will be referred to as second side combustion cylinder 35) mounted on the first-stage vane ring 47*f* is also present on the second circumferential side Dc2 with respect to a region where the last combustion cylinder 35 is mounted. Therefore, in the present embodiment, the combustion cylinder mounting jig 70 is not disposed between the last combustion cylinder 35 and the combustion cylinder 35 mounted on the first-stage vane ring 47*f* earlier than the last combustion cylinder 35 and the last combustion cylinder 35 is mounted on the first-stage vane ring 47*f* while the position of the last combustion cylinder 35 is being finely adjusted in the circumferential direction Dc such that the last combustion cylinder 35 can be disposed at a target relative position with respect to the first side combustion cylinder 35 in the circumferential direction Dc and can be disposed at a target relative position with respect to the second side combustion cylinder 35 in the circumferential direction Dc.

In a case where the fixing step (S8) for the last combustion cylinder 35 is finished, the side seals 52 are disposed between the plurality of combustion cylinders 35 (S9: side seal disposition step). At this time, one side seal 52 is inserted into the first seal groove 38*sg*1 of one of the combustion cylinders 35 adjacent to each other in the circumferential direction Dc and the second seal groove 38*sg*2 of the other of the combustion cylinders 35 from the radial outer side Dro such that the side seal 52 is disposed between the combustion cylinders 35.

In this manner, the mounting of the plurality of combustion cylinders 35 on the first-stage vane ring 47*f* is finished.

As described above, in the present embodiment, the spacer portion 71 of the combustion cylinder mounting jig 70 is interposed between the first combustion cylinder 35*a* and the second combustion cylinder 35*b* in the circumferential direction Dc. Therefore, it is possible to dispose with high accuracy the second combustion cylinder 35*b* at a target relative position with respect to the first combustion cylinder 35*a* in the circumferential direction Dc. Therefore, it is possible to omit fine adjustment for disposing the second combustion cylinder 35*b* with high accuracy at the target relative position with respect to the first combustion cylinder 35*a* in the circumferential direction Dc or to reduce the amount of fine adjustment. Therefore, in the present embodiment, it is possible to reduce the amount of work for mounting the plurality of combustion cylinders 35 in the turbine casing 45.

In the present embodiment, the predetermined interval d can be set as an interval in the circumferential direction Dc between a position where the second seal groove 38*sg*2 of the first combustion cylinder 35*a* is formed and a position where the first seal groove 38*sg*1 of the second combustion cylinder 35*b* is formed with high accuracy. Therefore, in the present embodiment, the sealing performance of the side seal 52 disposed between the first combustion cylinder 35*a* and the second combustion cylinder 35*b* can be improved.

Note that it is preferable that the second combustion cylinder 35*b* is one of the plurality of combustion cylinders 35 that is adjacent to the first combustion cylinder 35*a* in the circumferential direction Dc and that is disposed above the first combustion cylinder 35*a*. In this case, gravity acts on the combustion cylinder mounting jig 70 brought into contact with the second flange side surface 38*sp*2 of the first combustion cylinder 35*a* in a direction in which the combustion cylinder mounting jig 70 comes into contact with the second flange side surface 38*sp*2 of the first combustion cylinder 35*a*. Therefore, the contact property of the combustion cylinder mounting jig 70 with respect to the first combustion cylinder 35*a* is enhanced. Furthermore, gravity acts on the second combustion cylinder 35*b* brought into contact with the second contact surface 73*b* of the combustion cylinder mounting jig 70 in a direction in which the second combustion cylinder 35*b* comes into contact with the second contact surface 73*b* of the combustion cylinder mounting jig 70. Therefore, the contact property of the second combustion cylinder 35*b* with respect to the combustion cylinder mounting jig 70 is enhanced. Therefore, when the second combustion cylinder 35*b* is the combustion cylinder 35 disposed above the first combustion cylinder 35*a*, it is possible to dispose the second combustion cylinder 35*b* with high accuracy at a target relative position with respect to the first combustion cylinder 35*a* in the circumferential direction Dc.

As described above, in a case where the second combustion cylinder 35*b* is the combustion cylinder 35 disposed above the first combustion cylinder 35*a*, it is preferable that the reference combustion cylinder 35, which is the combustion cylinder 35 mounted on the first-stage vane ring 47*f* in S2 first, is the combustion cylinder 35 that is mounted on the lowest position on the first-stage vane ring 47*f*. In this case, the last combustion cylinder 35 mounted on the first-stage vane ring 47*f* is the combustion cylinder 35 mounted on the uppermost position on the first-stage vane ring 47*f*.

Modification Example

Hereinafter, various modification examples of the embodiment described above will be described.

Figure 12:
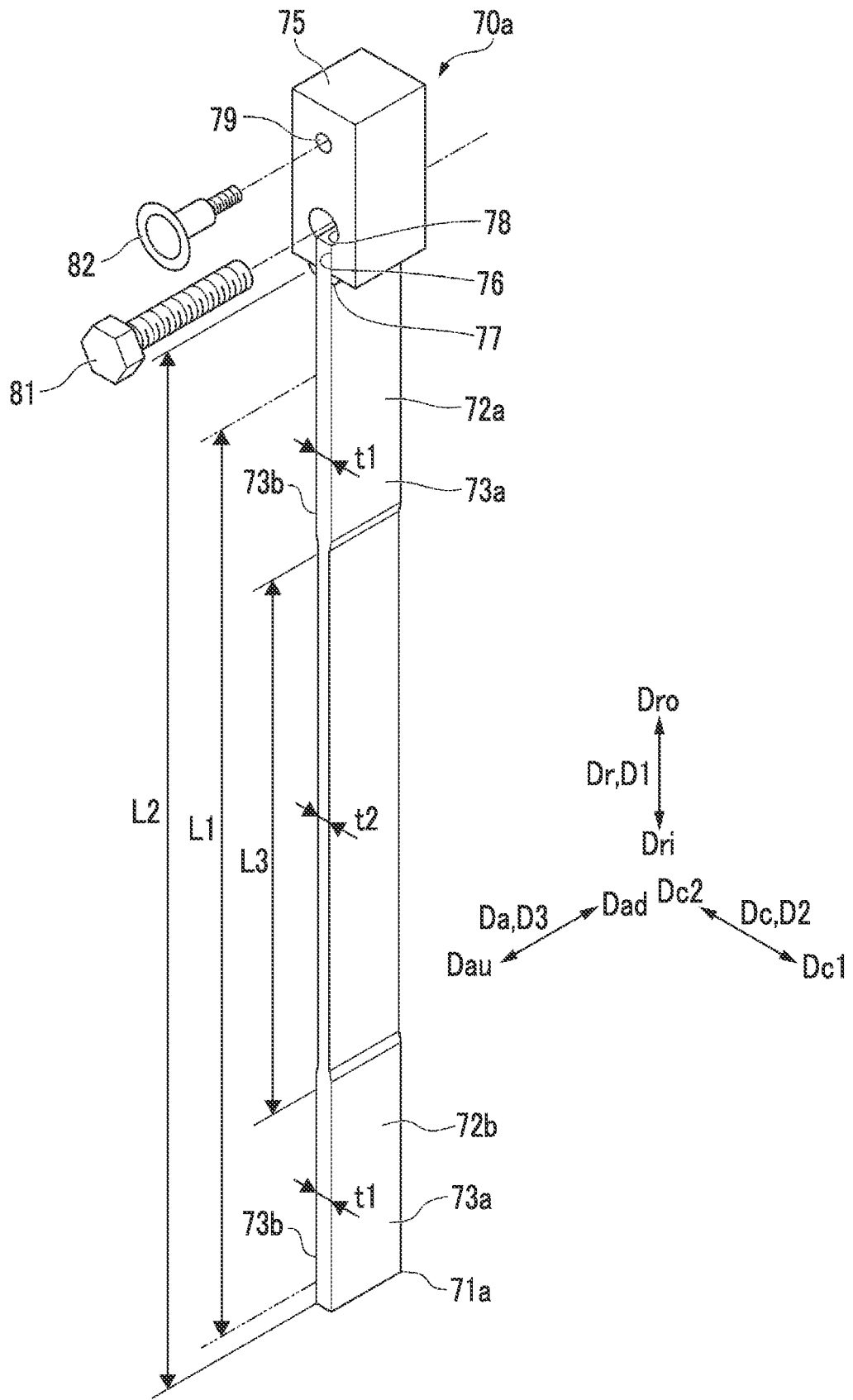
FIG. 12 is a perspective view of a combustion cylinder mounting jig according to a modification example of the embodiment of the present invention.

The entire spacer portion 71 of the combustion cylinder mounting jig 70 in the embodiment described above is the interval maintenance portion 72. However, an interval maintenance portion may be a portion of a spacer portion. Specifically, as shown in FIG. 12, a spacer portion 71*a* may include a first interval maintenance portion 72*a* and a second interval maintenance portion 72*b*, and the first interval maintenance portion 72*a* and the second interval maintenance portion 72*b* may constitute a portion of the spacer portion 71*a*. The first interval maintenance portion 72*a* and the second interval maintenance portion 72*b* are separated from each other in the first direction D1. However, a distance L3 between the first interval maintenance portion 72*a* and the second interval maintenance portion 72*b* in the first direction D1 is smaller than the length L1 in the radial direction Dr of the first flange side surface 38sp1 and the second flange side surface 38sp2 of each combustion cylinder 35.

Regarding each of the first interval maintenance portion 72a and the second interval maintenance portion 72b, one of two surfaces that face opposite sides in the second direction D2 is the first contact surface 73a and the other of the two surfaces is the second contact surface 73b. An interval between the first contact surface 73a and the second contact surface 73b of the first interval maintenance portion 72a, in other words, a thickness t1 which is a dimension of the first interval maintenance portion 72a in the second direction D2 is a dimension corresponding to the predetermined interval d. In addition, an interval between the first contact surface 73a and the second contact surface 73b of the second interval maintenance portion 72b, in other words, the thickness t1 which is a dimension of the second interval maintenance portion 72b in the second direction D2 is also a dimension corresponding to the predetermined interval d.

A thickness t2 in the second direction D2 of the spacer portion 71a at a portion between the first interval maintenance portion 72a and the second interval maintenance portion 72b is smaller than the thickness t1 in the second direction D2 of the first interval maintenance portion 72a and the second interval maintenance portion 72b. That is, the thickness t2 in the second direction D2 of the portion between the first interval maintenance portion 72a and the second interval maintenance portion 72b is smaller than the predetermined interval d.

Therefore, in the case of a combustion cylinder mounting jig 70a of the present modification example, the area of contact between the spacer portion 71a and the first combustion cylinder 35a and the area of contact between the spacer portion 71a and the second combustion cylinder 35b are smaller than those in the case of the combustion cylinder mounting jig 70 of the above-described embodiment when the spacer portion 71a is interposed between the first combustion cylinder 35a and the second combustion cylinder 35b. Therefore, in the present modification example, the combustion cylinder mounting jig 70a can be easily extracted from between the first combustion cylinder 35a and the second combustion cylinder 35b.

Figure 13:
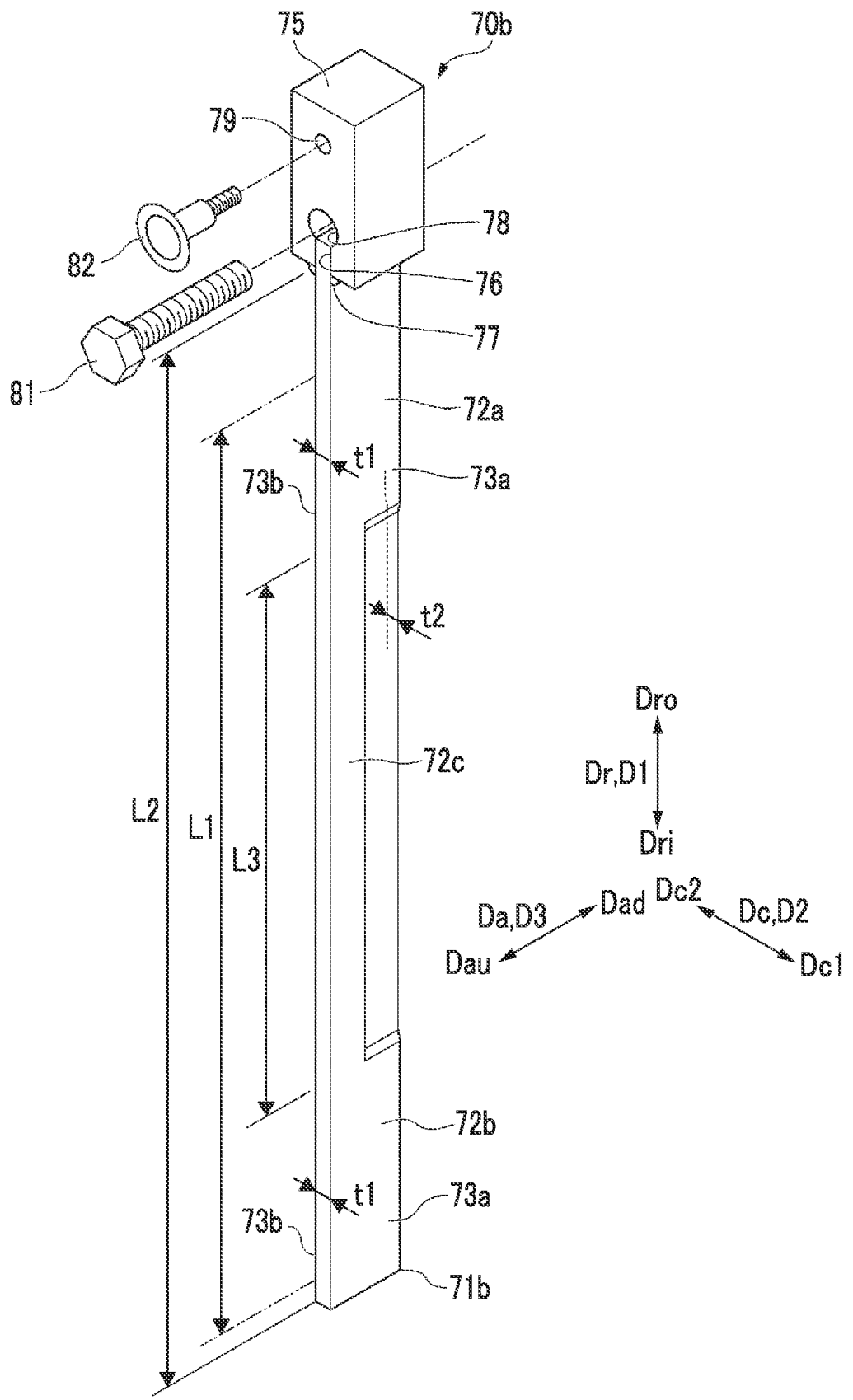
FIG. 13 is a perspective view of a combustion cylinder mounting jig according to another modification example of the embodiment of the present invention.

In addition, as shown in FIG. 13, a spacer portion 71b may include the first interval maintenance portion 72a, the second interval maintenance portion 72b, and a third interval maintenance portion 72c and the first interval maintenance portion 72a, the second interval maintenance portion 72b, and the third interval maintenance portion 72c may constitute a portion of the spacer portion 71b. The first interval maintenance portion 72a and the second interval maintenance portion 72b are separated from each other in the first direction D1. However, the distance L3 between the first interval maintenance portion 72a and the second interval maintenance portion 72b in the first direction D1 is smaller than the length L1 in the radial direction Dr of the first flange side surface 38sp1 and the second flange side surface 38sp2 of each combustion cylinder 35. In addition, the third interval maintenance portion 72c is formed between the first interval maintenance portion 72a and the second interval maintenance portion 72b in the first direction D1. The width of the third interval maintenance portion 72c in the third direction D3 is smaller than the width of the first interval maintenance portion 72a in the third direction D3 and the width of the second interval maintenance portion 72b in the third direction D3.

Regarding each of the first interval maintenance portion 72a, the second interval maintenance portion 72b, and the third interval maintenance portion 72c, one of two surfaces that face opposite sides in the second direction D2 is the first contact surface 73a and the other of the two surfaces is the second contact surface 73b. An interval between the first contact surface 73a and the second contact surface 73b of the first interval maintenance portion 72a, in other words, the thickness t1 which is a dimension of the first interval maintenance portion 72a in the second direction D2 is a dimension corresponding to the predetermined interval d. In addition, an interval between the first contact surface 73a and the second contact surface 73b of the second interval maintenance portion 72b, in other words, the thickness t1 which is a dimension of the second interval maintenance portion 72b in the second direction D2 is also a dimension corresponding to the predetermined interval d. Furthermore, the thickness t1 which is a dimension of the third interval maintenance portion 72c in the second direction D2 is also a dimension corresponding to the predetermined interval d.

The thickness t2 in the second direction D2 of a portion between the first interval maintenance portion 72a and the second interval maintenance portion 72b of the spacer portion 71b which excludes the third interval maintenance portion 72c is smaller than the thickness t1 in the second direction D2 of the first interval maintenance portion 72a, the second interval maintenance portion 72b, and the third interval maintenance portion 72c. That is, the thickness t2 in the second direction D2 of this portion is smaller than the predetermined interval d.

Therefore, in the case of a combustion cylinder mounting jig 70b of the present modification example as well, the area of contact between the spacer portion 71b and the first combustion cylinder 35a and the area of contact between the spacer portion 71b and the second combustion cylinder 35b are smaller than those in the case of the combustion cylinder mounting jig 70 of the above-described embodiment when the spacer portion 71b is interposed between the first combustion cylinder 35a and the second combustion cylinder 35b. Therefore, in the present modification example as well, the combustion cylinder mounting jig 70b can be easily extracted from between the first combustion cylinder 35a and the second combustion cylinder 35b.

In a case where it is deduced the combustion cylinder mounting jigs 70 and 70a can be easily extracted toward the axial upstream side Dau in each jig removal step (S6), the combustion cylinder mounting jigs 70 and 70a may not include the extraction metal fitting 82. In this case, the screw hole 79 of the spacer mounting portion 75 is not necessary.

In the above-described embodiment, the jig removal step (S6) is performed each time one second combustion cylinder 35b is mounted on the first-stage vane ring 47f. However, the jig removal step (S6) may be performed after all of the combustion cylinders 35 are mounted on the first-stage vane ring 47f. In this case, since the combustion cylinder mounting jigs 70 and 70a are not moved each time one second combustion cylinder 35b is mounted on the first-stage vane ring 47f, a plurality of the combustion cylinder mounting jigs 70 and 70a need to be prepared in the preparation step (S1).

In the above-described embodiment, the side seal disposition step (S9) is performed after all of the combustion cylinders 35 are mounted on the first-stage vane ring 47f. However, the side seal disposition step (S9) may be performed each time one second combustion cylinder 35b is mounted on the first-stage vane ring 47f (combustion cylinder fixing step (S5)).

In the fixing step (S2, S5, S8) for the combustion cylinder 35 of the present embodiment, the combustion cylinder 35 is directly mounted on the first-stage vane ring (stationary portion) 47f constituting a portion of the turbine casing 45. In addition, in the jig mounting step (S3b) of the present embodiment, the combustion cylinder mounting jigs 70 and 70a are directly mounted on the first-stage vane ring 47f constituting a portion of the turbine casing 45. However, a target on which the combustion cylinders 35 or the combustion cylinder mounting jigs 70 and 70a are mounted may not be the first-stage vane ring 47f as long as the target is a member positioned on the axial upstream side Dau in the turbine casing 45. For example, a target on which the combustion cylinders 35 or the combustion cylinder mounting jigs 70 and 70a are mounted may be a component mounted on the first-stage vane ring 47f. In this case, it can be said that a target on which the combustion cylinders 35 or the combustion cylinder mounting jigs 70 and 70a are mounted is an annular portion (stationary portion) that is annular around the axis Ar and that includes the component and the first-stage vane ring 47f.

In the above-described embodiment, the jig disposition step (S3a) in which the combustion cylinder mounting jigs 70 and 70a are brought into contact with the first combustion cylinder 35a and the jig mounting step (S3b) in which the combustion cylinder mounting jigs 70 and 70a are mounted on the first-stage vane ring 47f are performed in the first contact maintenance step (S3). However, if it is possible to maintain a state where the combustion cylinder mounting jigs 70 and 70a are in contact with the first combustion cylinder 35a without mounting the combustion cylinder mounting jigs 70 and 70a on the first-stage vane ring 47f, the jig mounting step (S3b) may not be performed. For example, after the combustion cylinder mounting jigs 70 and 70a are brought into contact with the first combustion cylinder 35a, the operator may hold the combustion cylinder mounting jigs 70 and 70a to maintain a state where the combustion cylinder mounting jigs 70 and 70a are in contact with the first combustion cylinder 35a. In this case, the spacer mounting portion 75 of the combustion cylinder mounting jigs 70 and 70a is not necessary. However, in a case where the operator holds the combustion cylinder mounting jigs 70 and 70a without the jig mounting step (S3b), the operator holding the combustion cylinder mounting jigs 70 and 70a may become an obstacle in an operation of bringing the second combustion cylinder 35b into contact with the combustion cylinder mounting jigs 70 and 70a during the second contact maintenance step (S4). Therefore, basically, it is favorable to perform the jig mounting step (S3b).

APPENDIX

The combustion cylinder mounting method in the above-described embodiment is understood as follows, for example.

(1) Regarding a combustion cylinder mounting method according to a first aspect,
a gas turbine to which the combustion cylinder mounting method is applied includes the turbine 40 including the rotor 41 rotatable around the axis Ar and the casing 45 covering an outer periphery of the rotor 41 and includes the plurality of combustors 30 sending the combustion gas G into the casing 45. The casing 45 includes the stationary portion 47f that is positioned in the casing 45 while being on the axial upstream side Dau out of the axial upstream side Dau and the axial downstream side Dad in the axial direction Da in which the axis Ar extends. Each of the plurality of combustors 30 includes the combustion cylinder 35 in which the combustion gas G flows. The respective combustion cylinders 35 of the plurality of combustors 30 are mounted on the stationary portion 47f while being arranged around the axis Ar along the circumferential direction Dc with respect to the axis Ar. Each of the plurality of combustion cylinders 35 includes the first side surface 36sp1 that faces the first circumferential side Dc1 out of the first circumferential side Dc1 and the second circumferential side Dc2 in the circumferential direction Dc and the second side surface 36sp2 that faces the second circumferential side Dc2.

The combustion cylinder mounting method includes the preparation step S1 of preparing the combustion cylinder mounting jigs 70 and 70a including the spacer portions 71 and 71a that are able to maintain an interval between the first combustion cylinder 35a and the second combustion cylinder 35b that are part of the plurality of the combustion cylinders 35 and are adjacent to each other in the circumferential direction Dc at a predetermined interval by being disposed between the first combustion cylinder 35a and the second combustion cylinder 35b at a predetermined position in the axial direction Da with respect to each of the first combustion cylinder 35a and the second combustion cylinder 35b, the first contact maintenance step S3 of bringing the spacer portions 71 and 71a into contact with the predetermined position of the first combustion cylinder 35a in the axial direction Da at the second side surface 36sp2 of the first combustion cylinder 35a mounted on the stationary portion 47f, the second contact maintenance step S4 of bringing the predetermined position of the second combustion cylinder 35b in the axial direction Da into contact with the spacer portions 71 and 71a during the first contact maintenance step S3 at the first side surface 36sp1 of the second combustion cylinder 35b, and the combustion cylinder fixing step S5 of mounting the second combustion cylinder 35b on the stationary portion in a state where the first combustion cylinder 35a and the second combustion cylinder 35b are in contact with the spacer portions 71 and 71a.

According to the aspect, since the spacer portions 71 and 71a of the combustion cylinder mounting jigs 70 and 70a are interposed between the first combustion cylinder 35a and the second combustion cylinder 35b in the circumferential direction Dc, it is possible to dispose with high accuracy the second combustion cylinder 35b at a target relative position with respect to the first combustion cylinder 35a in the circumferential direction Dc. Therefore, it is possible to omit fine adjustment for disposing the second combustion cylinder 35b with high accuracy at the target relative position with respect to the first combustion cylinder 35a in the circumferential direction Dc or to reduce the amount of fine adjustment. Therefore, according to the aspect, it is possible to reduce the amount of work for mounting the plurality of combustion cylinders 35 in the turbine casing 45.

(2) Regarding a combustion cylinder mounting method according to a second aspect,
in the combustion cylinder mounting method related to the first aspect, the combustion cylinder mounting jigs 70 and 70a prepared in the preparation step S1 further includes the spacer mounting portion 75 that is fixed to the spacer portions 71 and 71a and that is mountable on the stationary portion so as to maintain the spacer portions 71 and 71a to be immovable relative to the stationary portion 47f. The first contact maintenance step S3 includes the jig mounting step S3b of mounting the spacer mounting portion 75 on the stationary portion 47f in a state where the spacer portions 71 and 71a are in contact with the first combustion cylinder 35a.

After the combustion cylinder mounting jigs 70 and 70a are brought into contact with the first combustion cylinder 35a, the operator may hold the combustion cylinder mounting jigs 70 and 70a to maintain a state where the combustion cylinder mounting jigs 70 and 70a are in contact with the first combustion cylinder 35a. However, in a case where the operator holds the combustion cylinder mounting jigs 70 and 70a, the operator holding the combustion cylinder mounting jigs 70 and 70a may become an obstacle in an operation of bringing the second combustion cylinder 35b into contact with the combustion cylinder mounting jigs 70 and 70a during the second contact maintenance step S4, which results in a decrease in workability in the second contact maintenance step (S4). Therefore, according to the aspect, a decrease in workability in the second contact maintenance step S4 can be prevented since the jig mounting step S3b is performed.

(3) Regarding a combustion cylinder mounting method according to a third aspect, in the combustion cylinder mounting method related to the second aspect, the spacer portions 71 and 71a of the combustion cylinder mounting jigs 70 and 70a prepared in the preparation step S1 extend in the first direction D1. Each of the spacer portions 71 and 71a includes the interval maintenance portion 72 of which the thickness t1 in the second direction D2 perpendicular to the first direction D1 in the spacer portions 71 and 71a corresponds to the predetermined interval d.

(4) Regarding a combustion cylinder mounting method according to a fourth aspect, in the combustion cylinder mounting method related to the third aspect, the length L2 of the spacer portions 71 and 71a in the first direction D1 is larger than the length L1 of the combustion cylinder 35 in the radial direction Dr with respect to the axis Ar at the predetermined position in the axial direction Da of the combustion cylinder 35. The spacer mounting portion 75 is fixed to an end of the spacer portions 71 and 71a in the first direction D1.

According to the aspect, the predetermined interval d can be set as an interval that is between the first combustion cylinder 35a and the second combustion cylinder 35b and is on the radial outer side Dro and the predetermined interval d can be set as an interval that is between the first combustion cylinder 35a and the second combustion cylinder 35b and is on the radial inner side Dri. According to the aspect, furthermore, the spacer mounting portion 75 can be fixed to ends of the spacer portions 71 and 71a.

(5) Regarding a combustion cylinder mounting method according to a fifth aspect, in the combustion cylinder mounting method related to any one of the first to fourth aspects, the seal grooves 38sg1 and 38sg2 that extend in the radial direction Dr with respect to the axis Ar and into which the seal member 52 is fitted is respectively formed in the first side surfaces 36sp1 and the second side surfaces 36sp2 of the plurality of combustion cylinders 35. The predetermined position on each of the plurality of combustion cylinders 35 in the axial direction Da includes a position where the seal grooves 38sg1 and 38sg2 are formed.

According to the aspect, the predetermined interval d can be set as an interval in the circumferential direction Dc between a position where the seal groove 38sg2 of the first combustion cylinder 35a is formed and a position where the seal groove 38sg1 of the second combustion cylinder 35b is formed with high accuracy. Therefore, according to the aspect, the sealing performance of the seal member 52 disposed between the first combustion cylinder 35a and the second combustion cylinder 35b can be improved.

(6) Regarding a combustion cylinder mounting method according to a sixth aspect, in the combustion cylinder mounting method related to any one of the first to fifth aspects, the jig removal step S6 of moving the combustion cylinder mounting jigs 70 and 70a such that the spacer portions 71 and 71a that are in contact with the first combustion cylinder 35a and the second combustion cylinder 35b mounted on the stationary portion 47f is removed from between the first combustion cylinder 35a and the second combustion cylinder 35b is performed after the combustion cylinder fixing step S5.

(7) Regarding a combustion cylinder mounting method according to a seventh aspect, in the combustion cylinder mounting method related to the sixth aspect, in the jig removal step S6, the combustion cylinder mounting jigs 70 and 70a are moved toward the axial upstream side Dau.

(8) Regarding a combustion cylinder mounting method according to an eighth aspect, in the combustion cylinder mounting method related to the sixth aspect or the seventh aspect, in the jig removal step S6, the extraction metal fitting 82 is mounted into the spacer mounting portion 75 and the extraction metal fitting 82 is pulled so that the combustion cylinder mounting jigs 70 and 70a are moved.

According to the aspect, the jig removal step S6 can be easily performed.

(9) Regarding a combustion cylinder mounting method according to a ninth aspect, in the combustion cylinder mounting method related to any one of the first to eighth aspects, the second combustion cylinder 35b is one of the plurality of combustion cylinders 35 that is adjacent to the first combustion cylinder 35a in the circumferential direction Dc and that is disposed above the first combustion cylinder 35a.

According to the aspect, gravity acts on the combustion cylinder mounting jigs 70 and 70a brought into contact with the first combustion cylinder 35a in a direction in which the combustion cylinder mounting jigs 70 and 70a come into contact with the first combustion cylinder 35a. Therefore, the contact property of the combustion cylinder mounting jigs 70 and 70a with respect to the first combustion cylinder 35a is enhanced. Furthermore, according to the aspect, gravity acts on the second combustion cylinder 35b brought into contact with the combustion cylinder mounting jigs 70 and 70a in a direction in which the second combustion cylinder 35b comes into contact with the combustion cylinder mounting jigs 70 and 70a. Therefore, the contact property of the second combustion cylinder 35b with respect to the combustion cylinder mounting jigs 70 and 70a is enhanced. Therefore, according to the aspect, the second combustion cylinder 35b can be disposed at a target relative position in the circumferential direction Dc with respect to the first combustion cylinder 35a with high accuracy.

In addition, the combustion cylinder mounting jig in the above-described embodiment is understood as follows, for example.

(10) Regarding a combustion cylinder mounting jig according to a tenth aspect, a gas turbine to which the combustion cylinder mounting jig is applied includes the turbine 40 including the rotor 41 rotatable around the axis Ar and the casing 45 covering an outer periphery of the rotor 41 and includes the plurality of combustors 30 sending the combustion gas G into the casing 45. The casing 45 includes the stationary portion 47*f* that is positioned in the casing 45 while being on the axial upstream side Dau out of the axial upstream side Dau and the axial downstream side Dad in the axial direction Da in which the axis Ar extends. Each of the plurality of combustors 30 includes the combustion cylinder 35 in which the combustion gas G flows. The respective combustion cylinders 35 of the plurality of combustors 30 are mounted on the stationary portion 47*f* while being arranged around the axis Ar along the circumferential direction Dc with respect to the axis Ar.

The combustion cylinder mounting jig includes the spacer portions 71 and 71*a* that are able to maintain an interval between two combustion cylinders 35 that are part of the plurality of the combustion cylinders 35 and are adjacent to each other in the circumferential direction Dc at the predetermined interval d by being disposed between the two combustion cylinders 35 at a predetermined position in the axial direction da with respect to each of the two combustion cylinders 35 and the spacer mounting portion 75 that is fixed to the spacer portions 71 and 71*a* and that is mountable on the stationary portion 47*f* so as to maintain the spacer portions 71 and 71*a* to be immovable relative to the stationary portion 47*f*. The spacer portions 71 and 71*a* extend in the first direction D1, each of the spacer portions 71 and 71*a* includes the interval maintenance portion 72 of which the thickness in the second direction D2 perpendicular to the first direction D1 in the spacer portions 71 and 71*a* corresponds to the predetermined interval d. The length L2 of the spacer portions 71 and 71*a* in the first direction D1 is larger than the length L1 of the combustion cylinder 35 in the radial direction Dr with respect to the axis Ar at the predetermined position in the axial direction Da of the combustion cylinder 35. The spacer mounting portion 75 is fixed to an end of the spacer portions 71 and 71*a* in the first direction D1.

Since the spacer portions 71 and 71*a* of the combustion cylinder mounting jigs 70 and 70*a* are interposed between the first combustion cylinder 35*a* and the second combustion cylinder 35*b* in the circumferential direction Dc, it is possible to dispose with high accuracy the second combustion cylinder 35*b* at a target relative position with respect to the first combustion cylinder 35*a* in the circumferential direction Dc. Therefore, it is possible to omit fine adjustment for disposing the second combustion cylinder 35*b* with high accuracy at the target relative position with respect to the first combustion cylinder 35*a* in the circumferential direction Dc or to reduce the amount of fine adjustment. Therefore, by using the combustion cylinder mounting jigs 70 and 70*a* of the aspect, it is possible to reduce the amount of work for mounting the plurality of combustion cylinders 35 in the turbine casing 45.

According to the aspect, the predetermined interval d can be set as an interval that is between the first combustion cylinder 35*a* and the second combustion cylinder 35*b* and is on the radial outer side Dro and the predetermined interval d can be set as an interval that is between the first combustion cylinder 35*a* and the second combustion cylinder 35*b* and is on the radial inner side Dri. According to the aspect, furthermore, the spacer mounting portion 75 can be fixed to ends of the spacer portions 71 and 71*a*.

(11) Regarding a combustion cylinder mounting jig according to an eleventh aspect, in the combustion cylinder mounting jig related to the tenth aspect, the interval maintenance portion 72 includes the first interval maintenance portion 72*a* and the second interval maintenance portion 72*b* that is separated from the first interval maintenance portion 72*a* in the first direction D1. The thickness t2 in the second direction D2 of the spacer portion 71*a* at a portion between the first interval maintenance portion 72*a* and the second interval maintenance portion 72*b* is smaller than the predetermined interval d.

According to the aspect, the area of contact between the spacer portion 71*a* and the first combustion cylinder 35*a* and the area of contact between the spacer portion 71*a* and the second combustion cylinder 35*b* can be made small when the spacer portion 71*a* is interposed between the first combustion cylinder 35*a* and the second combustion cylinder 35*b*. Therefore, according to the aspect, the combustion cylinder mounting jig 70*a* can be easily extracted from between the first combustion cylinder 35*a* and the second combustion cylinder 35*b*.

(12) Regarding a combustion cylinder mounting jig according to a twelfth aspect, in the combustion cylinder mounting jig related to the tenth aspect or the eleventh aspect, the spacer mounting portion 75 includes the bolt insertion hole 78 into which the bolt 81 for mounting the spacer mounting portion 75 on the stationary portion 47*f* is insertable.

(13) Regarding a combustion cylinder mounting jig according to a thirteenth aspect, the combustion cylinder mounting jig related to any one of the tenth to twelfth aspects further includes the extraction metal fitting 82. The spacer mounting portion 75 includes the screw hole 79 into which the extraction metal fitting 82 is screwable.

According to the aspect, when the spacer portions 71 and 71*a* are interposed between the first combustion cylinder 35*a* and the second combustion cylinder 35*b*, it is possible to easily move the spacer portions 71 and 71*a* from between the first combustion cylinder 35*a* and the second combustion cylinder 35*b* by mounting the extraction metal fitting 82 into the spacer mounting portion 75 and pulling the extraction metal fitting 82.

(14) Regarding a combustion cylinder mounting jig according to a fourteenth aspect, in the combustion cylinder mounting jig related to any one of the tenth to thirteenth aspects, the spacer mounting portion 75 includes the slit 76 that is recessed inward from an outer peripheral surface. The ends of the spacer portions 71 and 71*a* in the first direction D1 are inserted into the slit 76 and fixed to the spacer mounting portion 75.

The spacer portions 71 and 71*a* are likely to be worn because of contact between the spacer portion 71 and the combustion cylinders 35. Therefore, in a case where the combustion cylinder mounting jigs 70 and 70*a* are used repeatedly, the spacer portions 71 and 71*a* are thinned and a function of maintaining an interval between two combustion cylinders 35 is deteriorated. Therefore, it is preferable that the spacer portions 71 and 71*a* are replaceable. According to the aspect, the spacer portions 71 and 71*a* and the spacer mounting portion 75 are manufactured as separate components and then both of the components are bonded to each other via welding. Therefore, the spacer portions 71 and 71*a* can be removed from the spacer mounting portion 75 relatively easily, and thus the spacer portions 71 and 71*a* can be easily replaced. Furthermore, according to the aspect, the spacer portions 71 and 71a and the spacer mounting portion 75 are welded after the ends of the spacer portions 71 and 71a are inserted into the slit 76 of the spacer mounting portion 75. Therefore, it is possible to firmly fix the spacer portions 71 and 71a to the spacer mounting portion 75 while securing easiness of replacement of the spacer portions 71 and 71a.

INDUSTRIAL APPLICABILITY

According to an aspect of the present disclosure, it is possible to dispose a combustion cylinder that is adjacent to another combustion cylinder in a circumferential direction at a target relative position with respect to the other combustion cylinder in the circumferential direction. Therefore, according to the aspect of the present disclosure, it is possible to reduce the amount of work for mounting a plurality of combustion cylinders in a turbine casing.

REFERENCE SIGNS LIST

11: Gas turbine rotor
15: Gas turbine casing
16: Intermediate casing
20: Compressor
21: Compressor rotor
22: Rotor shaft
23: Rotor vane row
24: Rotor vane
25: Compressor casing
28: Stator vane row
29: Stator vane
30: Combustor
31: Burner
32: Burner frame
35: Combustion cylinder (or transition piece)
35a: First combustion cylinder
35b: Second combustion cylinder
36: Tube
36o: Outer plate
36i: Inner plate
36s1: First side plate
36sp1: First side surface
36s2: Second side plate
36sp2: Second side surface
37o: Outer outlet flange
37i: Inner outlet flange
38s1: First side flange
38sp1: First flange side surface
38sg1: First seal groove (seal groove)
38s2: Second side flange
38sp2: Second flange side surface
38sg2: Second seal groove (seal groove)
39: Casing mounting plate
39h: Bolt hole
40: Turbine
41: Turbine rotor
42: Rotor shaft
43: Rotor vane row
44: Rotor vane
45: Turbine casing
46: Casing main body
47: Vane ring
47f: First-stage vane ring (stationary portion)
47pu: Upstream side end surface
47ha: Tube mounting screw hole
47hb: Jig mounting screw hole
48: Stator vane row
48f: First-stage stator vane row
49: Stator vane
49f: First-stage stator vane
49b: Vane body
49o: Outer shroud
49i: Inner shroud
51: Tube mounting bolt
52: Side seal (seal member)
60o: Outer outlet seal
60i: Inner outlet seal
70, 70a: Combustion cylinder mounting jig
71: Spacer portion
72: Interval maintenance portion
72a: First interval maintenance portion
72b: Second interval maintenance portion
73a: First contact surface
73b: Second contact surface
75: Spacer mounting portion
76: Slit
77: Welded portion
78: Bolt insertion hole
79: Screw hole
81: Jig mounting bolt
82: Extraction metal fitting
A: Air
F: Fuel
G: Combustion gas
Ar: Axis
Ca: Combustor axis
Da: Axial direction
Dau: Axial upstream side
Dad: Axial downstream side
Dc: Circumferential direction
Dc1: First circumferential side
Dc2: Second circumferential side
Dr: Radial direction
Dri: Radial inner side
Dro: Radial outer side
D1: First direction
D2: Second direction
D3: Third direction

The invention claimed is:

1. A combustion cylinder mounting method in a gas turbine that includes a turbine including a rotor rotatable around an axis and a casing covering an outer periphery of the rotor and that includes a plurality of combustors sending a combustion gas into the casing and in which the casing includes a stationary portion that is positioned in the casing while being on an axial upstream side out of the axial upstream side and an axial downstream side in an axial direction in which the axis extends, each of the plurality of combustors includes a combustion cylinder in which the combustion gas flows, the respective combustion cylinders of the plurality of combustors are mounted on the stationary portion while being arranged around the axis along a circumferential direction with respect to the axis, and each of a plurality of the combustion cylinders includes a first side surface that faces a first circumferential side out of the first circumferential side and a second circumferential side in the circumferential direction and a second side surface that faces the second circumferential side, the combustion cylinder mounting method comprising:

a preparation step of preparing a combustion cylinder mounting jig including a spacer portion that is able to maintain an interval between a first combustion cylinder and a second combustion cylinder that are part of the plurality of the combustion cylinders and are adjacent to each other in the circumferential direction at a predetermined interval by being disposed between the first combustion cylinder and the second combustion cylinder at a predetermined position in the axial direction with respect to each of the first combustion cylinder and the second combustion cylinder;

a first contact maintenance step of bringing the spacer portion into contact with the predetermined position of the first combustion cylinder in the axial direction at the second side surface of the first combustion cylinder mounted on the stationary portion;

a second contact maintenance step of bringing the predetermined position of the second combustion cylinder in the axial direction into contact with the spacer portion during the first contact maintenance step at the first side surface of the second combustion cylinder; and a combustion cylinder fixing step of mounting the second combustion cylinder on the stationary portion in a state where the first combustion cylinder and the second combustion cylinder are in contact with the spacer portion.

2. The combustion cylinder mounting method according to claim 1, wherein the combustion cylinder mounting jig prepared in the preparation step further includes a spacer mounting portion that is fixed to the spacer portion and that is mountable on the stationary portion so as to maintain the spacer portion to be immovable relative to the stationary portion, and the first contact maintenance step includes a jig mounting step of mounting the spacer mounting portion on the stationary portion in a state where the spacer portion is in contact with the first combustion cylinder.

3. The combustion cylinder mounting method according to claim 2, wherein the spacer portion of the combustion cylinder mounting jig prepared in the preparation step extends in a first direction, and the spacer portion includes an interval maintenance portion of which a thickness in a second direction perpendicular to the first direction in the spacer portion corresponds to the predetermined interval.

4. The combustion cylinder mounting method according to claim 3, a length of the spacer portion in the first direction is larger than a length of the combustion cylinder in a radial direction with respect to the axis at the predetermined position in the axial direction of the combustion cylinder, and the spacer mounting portion is fixed to an end of the spacer portion in the first direction.

5. The combustion cylinder mounting method according to claim 2, wherein a jig removal step of moving the combustion cylinder mounting jig such that the spacer portion that is in contact with the first combustion cylinder and the second combustion cylinder mounted on the stationary portion is removed from between the first combustion cylinder and the second combustion cylinder is performed after the combustion cylinder fixing step.

6. The combustion cylinder mounting method according to claim 5, wherein, in the jig removal step, the combustion cylinder mounting jig is moved toward the axial upstream side.

7. The combustion cylinder mounting method according to claim 5, wherein, in the jig removal step, an extraction metal fitting is mounted into the spacer mounting portion and the extraction metal fitting is pulled so that the combustion cylinder mounting jig is moved.

8. The combustion cylinder mounting method according to claim 1, wherein a seal groove that extends in a radial direction with respect to the axis and into which a seal member is fitted is formed in each of the first side surfaces and the second side surfaces of the plurality of combustion cylinders, and the predetermined position on each of the plurality of combustion cylinders in the axial direction includes a position where the seal groove is formed.

9. The combustion cylinder mounting method according to claim 1, wherein the second combustion cylinder is one of the plurality of combustion cylinders that is adjacent to the first combustion cylinder in the circumferential direction and that is disposed above the first combustion cylinder.

* * * * *